United States Patent
Holakouei et al.

(10) Patent No.: US 10,716,122 B2
(45) Date of Patent: Jul. 14, 2020

(54) SPLIT BEARER DUAL/MULTIPLE CONNECTIVITY RETRANSMISSION DIVERSITY

(71) Applicant: Nokia Technologies Oy, Espoo (FI)

(72) Inventors: Reza Holakouei, Wroclaw (PL); Venkatkumar Venkatasubramanian, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/092,376

(22) PCT Filed: Apr. 14, 2017

(86) PCT No.: PCT/IB2017/052177
§ 371 (c)(1),
(2) Date: Oct. 9, 2018

(87) PCT Pub. No.: WO2017/182927
PCT Pub. Date: Oct. 26, 2017

(65) Prior Publication Data
US 2019/0098640 A1   Mar. 28, 2019

Related U.S. Application Data

(60) Provisional application No. 62/324,567, filed on Apr. 19, 2016.

(51) Int. Cl.
*H04W 72/08* (2009.01)
*H04L 1/18* (2006.01)
(Continued)

(52) U.S. Cl.
CPC ......... *H04W 72/085* (2013.01); *H04L 1/1825* (2013.01); *H04L 1/1835* (2013.01);
(Continued)

(58) Field of Classification Search
CPC .................................................. H04W 72/085
(Continued)

(56) References Cited

U.S. PATENT DOCUMENTS

| 2005/0027948 | A1* | 2/2005 | Marlan | G06F 9/3824 711/150 |
| 2012/0163357 | A1* | 6/2012 | Won | H04L 1/1671 370/338 |

(Continued)

FOREIGN PATENT DOCUMENTS

| WO | 2015/047858 A1 | 4/2015 |
| WO | 2015/048287 A1 | 4/2015 |

OTHER PUBLICATIONS

Office action received for corresponding European Patent Application No. 17719347.1, dated Oct. 8, 2019, 4 pages.
(Continued)

*Primary Examiner* — Peter G Solinsky
(74) *Attorney, Agent, or Firm* — Harrington & Smith

(57) ABSTRACT

When a radio bearer for sending packets to a UE is split between master and secondary network nodes, then based on relative network conditions (such as relative link quality in view of latency targets or other conditions that reflect user-plane loading) between that master and secondary network nodes a redundancy retransmission mode may be selected from among multiple redundancy retransmission modes. Each of these redundancy retransmission modes define a different protocol for retransmitting multiple copies of selected ones of the packets to the UE over the split radio bearer. These multiple copies are then wirelessly retransmitted to the UE over the split radio bearer according to the selected redundancy retransmission mode. In one example there are 4 possible modes and different modes retransmit PDCP PDUs versus RLC PDUs; in one mode the master and
(Continued)

secondary network nodes both perform retransmissions of the identical selected packets.

25 Claims, 16 Drawing Sheets

(51) Int. Cl.
    *H04L 5/00*         (2006.01)
    *H04L 12/26*       (2006.01)
    *H04L 1/00*         (2006.01)

(52) U.S. Cl.
    CPC .......... *H04L 1/1874* (2013.01); *H04L 5/0032* (2013.01); *H04L 5/0055* (2013.01); *H04L 43/0858* (2013.01); *H04L 2001/0097* (2013.01)

(58) Field of Classification Search
    USPC ........................................................ 370/252
    See application file for complete search history.

(56) References Cited

U.S. PATENT DOCUMENTS

| | | | |
|---|---|---|---|
| 2013/0136102 A1* | 5/2013 | Macwan | H04W 4/00 370/331 |
| 2014/0098761 A1* | 4/2014 | Lee | H04W 74/006 370/329 |
| 2016/0142518 A1* | 5/2016 | Raina | H04L 69/04 370/230 |
| 2016/0255675 A1* | 9/2016 | Van Lieshout | H04L 1/1829 370/329 |

OTHER PUBLICATIONS

International Search Report and Written Opinion received for corresponding Patent Cooperation Treaty Application No. PCT/IB2017/052177, dated Jun. 29, 2017, 16 pages.

* cited by examiner

SPLIT BEARER DUAL/MULTIPLE CONNECTIVITY RETRANSMISSION DIVERSITY

RELATED APPLICATION

This application was originally filed as Patent Cooperation Treaty Application No. PCT/IB2017/052177 filed Apr. 14, 2017, which claims priority benefit to U.S. Provisional Patent Application No. 62/324,567, filed Apr. 19, 2016.

TECHNOLOGICAL FIELD

The described invention relates to wireless communications, and more particularly to arranging the re-transmission of packets when a radio bearer to a single user equipment (UE) is split among two or more different network access nodes.

BACKGROUND

Dual connectivity has been one of the recent features in LTE-Advanced. 5G networks are expected to use dual connectivity (DC) and multi-connectivity (MC) for supporting services with enhanced coverage, reliability and/or throughput requirements. Multi-connectivity can be used for both extreme mobile broadband and machine type communications (MTC), for example throughput and reliability for mobile broadband video, and ultra-reliable communications for MTC. Multi-connectivity may further leverage the additional spectrum that will be available for 5G networks. Thus for example, the master node may act as the anchor carrier in one 5G frequency band while the secondary cells may be configured to transmit in other frequency bands.

Packet delivery of certain services and applications have certain reliability requirements and certain latency targets. For example, a video content is served to a user with a desirable latency guarantee without dropping too many packets and adversely affecting the user experience. Other examples involve industrial MTC (industrial automation) scenarios that may also require stringent latency requirements with minimal packet drop targets.

Multi-connectivity is one way of supporting services in future 5G networks, wherein multi-node carrier aggregation can be employed to use multiple frequency bands. A particular type of multi-connectivity may split a bearer or an Internet Protocol (IP) flow between multiple transmitting nodes such as primary and secondary base stations which may not be geographically co-located. In such a multi-connectivity scenario (sometimes known as dual-connectivity DC or multi-connectivity MC) data is transmitted via two or more base stations such that a portion of the data is transmitted via a master base station and a different portion of the data is sent via one or more secondary base stations. The data split is done at the packet data convergence protocol (PDCP) layer, with some of the PDCP packets sent by the master base station and some of the packets sent by the secondary base station. The user equipment receives the data from the multiple nodes (base stations), and re-orders the PDCP packets at the PDCP layer.

In practical deployments poor link quality can result in dropped packets from either the master or secondary base stations which could impact the reliability of packet delivery. For instance, the master node could be facing a severe congestion with many users to be served. In that case some of the packets that are to be served to a far-away UE that is experiencing poor link quality may be dropped from the transmission buffer of the master node. In some implementations, the packets may be transmitted but incorrectly received by the UE. If the master node resolved this by simply adjusting the split bearer ratio so as to assign more of this UE's packets to the secondary node), the secondary node's radio link could become overloaded because the frequencies configured for the master node may not be utilized for data. This may result in a situation that the radio layer of the secondary node which may be configured with higher frequencies would not be able to meet the required throughput for the service when it tries to provide increased reliability. The problem then is to achieve a good trade-off between throughput and ultra-reliability. As detailed below, embodiments of these teachings can increase both the achieved throughput and the achieved reliability of packet reception at the UE via a dynamic mechanism of higher layer re-transmissions; this is well adapted for latency critical traffic in 5G systems. Packet re-transmission is well known in the wireless arts as re-sending a packet in response to a negative acknowledgement (NACK) from the intended recipient. In practice a NACK may be indicated by the absence of an acknowledgement (ACK). Transmitted packets are tracked by the respective sender in hybrid automatic repeat request (HARQ) processes which define the exact radio resources on which to send the re-transmission.

BRIEF SUMMARY

According to a first aspect of these teachings there is a method comprising: choosing to redundantly retransmit from multiple nodes in a radio bearer that is split between a master network node and a secondary network node for wirelessly sending packets to a user equipment (UE); determining relative network conditions between the master network node and the secondary network node; based on the relative network conditions, selecting a redundancy retransmission mode from among multiple redundancy retransmission modes, each redundancy retransmission mode defining a different protocol for retransmitting multiple copies of selected ones of the packets to the UE over the split radio bearer; and wirelessly retransmitting to the UE the multiple copies of the selected packets over the split radio bearer according to the selected redundancy retransmission mode.

According to a second aspect of these teachings there is a computer readable memory storing computer program instructions. In this embodiment when such computer program instructions are executed by one or more processors they cause a master network node to perform actions comprising: choosing to redundantly retransmit from multiple nodes in a radio bearer that is split between the master network node and a secondary network node for wirelessly sending packets to a user equipment (UE); determining relative network conditions between the master network node and the secondary network node; based on the relative network conditions, selecting a redundancy retransmission mode from among multiple redundancy retransmission modes, each redundancy retransmission mode defining a different protocol for retransmitting multiple copies of selected ones of the packets to the UE over the split radio bearer; and wirelessly retransmitting to the UE the multiple copies of the selected packets over the split radio bearer according to the selected redundancy retransmission mode.

According to a third aspect of these teachings there is an apparatus for communicating with a secondary network node and with a user equipment. In this embodiment the apparatus comprises at least one memory storing computer program instructions and at least one processor. The at least one memory with the computer program instructions is configured with the at least one processor to cause the apparatus to at least: choose to redundantly retransmit from multiple nodes in a radio bearer that is split between a master network node and a secondary network node for wirelessly sending packets to a user equipment (UE); determine relative network conditions between the master network node and the secondary network node; based on the relative network conditions, select a redundancy retransmission mode from among multiple redundancy retransmission modes, each redundancy retransmission mode defining a different protocol for retransmitting multiple copies of selected ones of the packets to the UE over the split radio bearer; and wirelessly retransmit to the UE the multiple copies of the selected packets over the split radio bearer according to the selected redundancy retransmission mode. In embodiments the apparatus can be the master node or one or more components of the master node.

These and other aspects are detailed further below with particularity.

DETAILED DESCRIPTION

Figure 1:
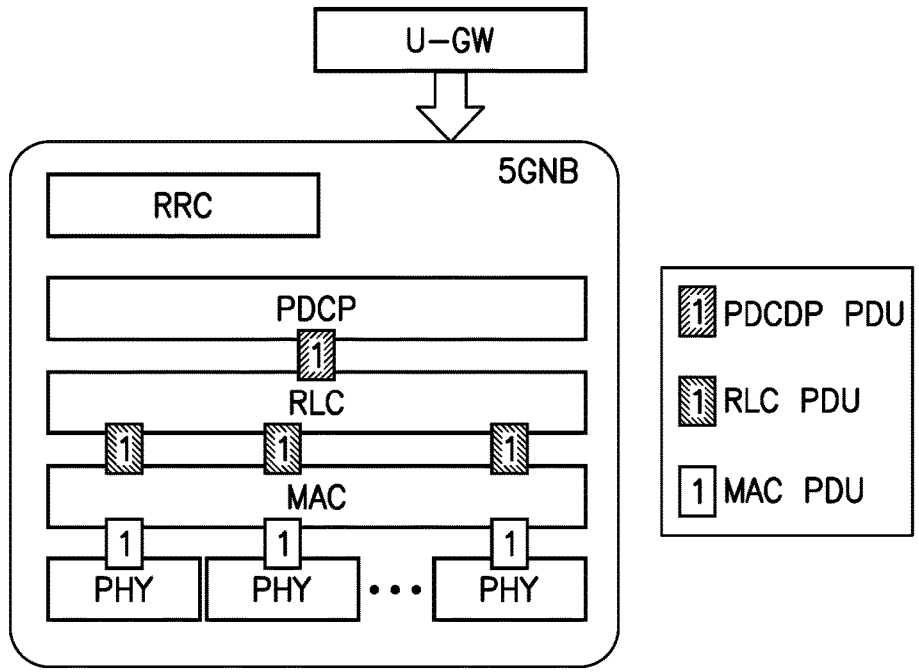
FIG. 1 is a schematic block diagram of a protocol stack within a network node such as the master or secondary node showing redundant transmissions according to an example embodiment.

The description below assumes dual connectivity for clarity of explanation, but it will be apparent that these dual connectivity examples are readily extendable to more general multi-connectivity scenarios where the UE's data bearer may be split among two or more network nodes. The examples below assume the governing radio technology is LTE or LTE-Advanced in which case the master and secondary/slave nodes are eNodeBs, but neither the radio access technology nor the specific embodiment of the network access nodes that implement the techniques described herein are limiting aspects of these teachings.

Conventionally for 3GPP radio technologies the packet retransmissions and re-ordering of packets for split bearer type 3C dual connectivity are handled by separate media access control (MAC) and radio link control (RLC) protocol stack entities that are configured in the master and secondary nodes. The UE also configures separate RLC entities such that the UE will have a RLC entity for the master node and another RLC entity for the secondary node. It is the PDCP layer at the UE that re-orders the packets delivered by the two RLC entities. Conventionally, MAC and RLC re-transmissions will be performed by the master and secondary nodes for the packets that were transmitted by the respective nodes.

As will be evident from the examples below, embodiments of these teachings employ an increased redundancy for retransmission of PDCP protocol data units (PDUs) using multi-connectivity. In the specific example below there are four different modes from which to select for increasing redundancy re-transmissions via transmitting multiple copies of PDCP PDUs which exploit duplication buffer at the secondary node. One of these possible configuration modes are selected based on current conditions. The multiple copies of PDCP PDUs can also be re-transmitted as multiple copies of RLC PDUs.

In other deployments there may be more or less than four different redundancy retransmission modes from which to choose when the radio bearer is split. Because the mode selection is dynamic it may be changed while the bearer remains split between master and secondary/slave nodes, as conditions experienced by those nodes and by the UE they serve via the split bearer change.

These four example redundancy retransmission modes are summarized as follows. Either the master or secondary node can perform increased redundancy re-transmission via transmitting multiple copies of a PDCP PDU using multiple cell groups (frequencies). For example, the secondary node/cell may re-transmit replicas of the same PDCP PDU in different frequency carriers. The multiple copies of PDCP PDU can be transmitted as multiple copies of RLC PDU. Further, both the master and secondary nodes can perform re-transmission of the same PDCP PDU in the so called RLC node diversity.

These four example modes are detailed below in Table 1.

may also keep a duplicate copy in its own buffer. In this manner modes 3 and 4 in Table 1 above may be employed using duplicated data at the secondary node(s).

| Redundancy Retransmission Mode | Activation condition | Working example |
| --- | --- | --- |
| 1. Master and secondary perform independent RLC retransmissions (multiple copies of a RLC PDU) | Master and secondary are both lightly loaded, <50% | Master re-transmit multiple copies of a PDCP PDU A in multiple cell groups, for example 2 copies of the same PDCP PDU A. Secondary re-transmit replicas of the PDCP PDU B in multiple cell groups. For example, 2 copies of the same PDU B |
| 2. Master performs re-transmissions for secondary (multiple copies of a RLC PDU) | The user plane of secondary is more loaded >50%, master is lightly loaded | Master re-transmits multiple copies of both PDCP PDU A and PDCP PDU B using multiple cell groups. For example, 2 copies of PDU A and 2 copies of PDU B |
| 3. Secondary performs re-transmissions for master (multiple copies of a RLC PDU) | The master is more loaded >50%, secondary is lightly loaded | Secondary re-transmits multiple copies of both PDCP PDU A and PDCP PDU B using multiple cell groups. For example, 2 copies of PDU A and 2 copies of PDU B |
| 4. Both master and secondary perform re-transmissions of same PDCP PDU - RLC node diversity (multiple copies of a RLC PDU) | Both master and secondary are highly loaded >50% | Both master and secondary re-transmit copies of both PDCP PDU A and PDCP PDU B. For example, 1 copy of PDU A re-transmitted by master and another copy of PDU A re-transmitted by secondary. Similarly for PDU B. |

These modes are intended to increase the packet delivery reliability within a latency window. The increased redundancy re-transmission mode is dynamically configured for a split bearer under certain network conditions; for example a) the service requiring both high packet delivery reliability within a certain latency target, and b) the relative quality of service (QoS) and network conditions from the master and secondary node.

FIG. 1 is a schematic block diagram of a protocol stack within a network node such as the master or secondary node showing redundant transmissions according to an example embodiment. The different protocol layers are marked radio resource control (RRC), PDCP, RLC, MAC and physical (PHY). A single PDU from the PDCP layer is made into multiple identical copies of a RLC PDU at the RLC layer, which are passed through the MAC layer (to become MAC PDUs) and separately transmitted on the different PHY layer entities as multiple identical MAC PDUs.

According to embodiments of these teachings there are certain mechanisms to enable the increased redundancy modes.

A first such mechanism concerns selective PDCP duplication at the secondary node. Specifically, based on lower layer key performance indicators (KPIs) and quality of service (QoS) measurements on the link between the master node and a UE, UEs and bearers are selected for duplication at the secondary node. For example, the experienced physical layer (PHY) throughput of a selected bearer within a UE may not be less than a required QoS target from the master node. For the UEs which do not readily meet this QoS target, the master node may proactively forward its PDCP PDU packets of selected bearers associated with those UEs for duplication at the secondary node(s), and the master node In this first mechanism the duplicated packets are stored in a separate buffer at the secondary node, as compared to the packets that are conventionally received for split bearer transmission. This is because the duplicated packets are only transmitted by the secondary nodes upon receiving a dedicated signaling indication, either from the master node or the UE. The UE may then send a PDCP status report indicating the missing PDCP service data units (SDUs) to one or both of the master and secondary nodes. Typically a PDU contains multiple SDUs, but note that a single SDU may also be split among two PDUs in order to fill up a given PDU. In LTE it is conventional for the UE to report its missing packets in terms of missing SDUs. If the UE sends this PDCP status report to the secondary node that will be the dedicated signaling indication; if the UE sends it only to the master node the master node will then inform the secondary node via its own dedicated signaling indication.

A second such mechanism concerns increased redundancy modes. Specifically, based on certain triggers (for example, after the receipt of the PDCP status report from the UE with an indication of the missing PDCP SDUs, optional RLC ACK/NACK statistics or QoS measurements and report) the master and secondary nodes may use an increased redundancy mode selected from among the four possible modes in Table 1 above. In mode 3 of that table the secondary node performs all re-transmissions by re-transmitting multiple copies of a PDU in different carrier frequencies. A common MAC layer protocol at the secondary node may perform scheduling of the copies of a RLC PDU in multiple frequencies by treating them as different MAC PDUs, as FIG. 1 illustrates. The re-transmission PDCP PDUs may be one-to-one mapped to the RLC PDU, or they may instead use a fixed a priori mapping to the RLC PDU for this purpose. Multiple MAC PDUs may be generated out of a single RLC PDU as FIG. 1 illustrates for increased redundancy re-transmission. This enables deployments of these teachings to utilize the RLC ACK/NACK as the indication of PDCP PDU reception or lack thereof.

In the RLC node diversity mode 4 from Table 1 above both master and secondary nodes retransmit the same missing PDCP PDUs. One technical effect of this RLC node diversity mode is that the RLC layers at both the master and secondary nodes would be processing the same PDUs independently, and independently communicating to the MAC and PHY layers within those nodes (see FIG. 1).

The RLC node diversity mode thus makes use of inherent diversity from different MAC layer processing; for example the MAC layer of the secondary node may prioritize the packets differently as compared to the MAC layer of the master node based on their respective network conditions (small scale fading, interference conditions etc.). This means that the MAC layers of both the master and secondary may end up scheduling in the same PDCP PDU re-transmission non-coherently in different time slots, because they may experience different levels of congestion and load in their respective cells/frequencies.

For the case of mode 4 (in which the master and secondary nodes re-transmit duplicates) of the increased redundancy modes from the example Table 1 above), if RLC acknowledged mode (AM, different from transparent mode TM and from unacknowledged mode UM) is used optionally, the UE can determine a fused RLC layer ACK/NACK at pre-determined time intervals. The fused ACK/NACK represents the fusion of ACK/NACKs using a logical OR function applied to the ACK/NACK of multiple copies of the same PDU which were re-transmitted. In one example the UE can multicast this fused ACK/NACK to both the master and secondary nodes, which will serve as the dedicated signaling indication mentioned above. This multicasting can be done either on a common lower frequency carrier or duplicated on different carrier frequencies to reduce errors in ACK/NACK reception at the master and secondary network access nodes.

The master node may optionally attach a priority indicator while forwarding to the secondary node the PDCP PDUs that have to be stored in the duplicated buffer for possible later re-transmission by the secondary node in the event of a NACK from the UE (or other such dedicated signaling indication from the master node).

The master node may activate modes 3 and 4 of Table 1 above by instructing the secondary node to perform re-transmission of some specific (missing) PDCP PDUs from the duplicated buffer via signaling on the X2 interface that runs between them. Other radio access technologies typically will have a similar interface between these nodes though it may be known by a different name.

In another embodiment, the UE can trigger and assist the increased redundancy mode as follows. First, the UE can trigger the above mentioned PDCP status report based on lower layer QoS measurements (for example, PHY layer throughput), or based on the master node's request. The UE can further augment a dynamic cell selection indication (such as a secondary cell group selection indication) within the status report to indicate the desired set of secondary cells which may perform retransmissions according to these teachings. Secondly, the UE can also indicate the preferred carrier frequency within the secondary node by indicating the preferred secondary cell within the secondary cell group at the secondary node.

For deployment in a LTE system the UE can send a conventional PDCP status report which indicates the PDCP sequences that are missing, but in this case the UE can send this conventional status report based on a re-establishment trigger that conventional LTE reserves for re-establishing a lost connection. In this case there is no lost connection so the conventional LTE status report trigger is re-used herein for a different purpose.

As mentioned above, it is advantageous for the secondary node to maintain for a given UE at least two different transmit buffers. In this case buffer A would be reserved for storing the PDCP PDUs to be transmitted by the secondary as a split bearer (original transmissions that are not re-transmissions), whereas buffer B would be a separate transmit buffer reserved for storing the duplicates of the PDCP PDUs that were originally transmitted by the primary cell (master node). Buffer B is then exploited for re-transmissions from the secondary cell of the PDCP PDUs that were sent as original transmissions by the master cell, and NACK'd.

After receiving PDCP status report and based on the aforementioned QoS report, re-transmission functions may in an embodiment then be handled in one of the increased redundancy modes from Table 1.

The master node and secondary node may both map re-transmission PDCP PDUs to RLC PDUs without concatenation or segmentation, for example by employing a one-one mapping as mentioned above. Thus a RLC layer ACK/NACK of a RLC PDU can be used by both the secondary node and by the master node as an indication of receipt of that PDCP PDU which is missing at the UE.

The QoS conditions which trigger the aforementioned duplication of data at the secondary node and the RLC diversity can be application specific; for example detection of excessive packet loss by the UE's RLC and PDCP sub-layers from the master node, or physical layer throughput on the split bearer which is below an acceptable minimum.

In an embodiment the increased redundancy modes can be used for a certain subset of flows within a split bearer, so for example the selection of which re-transmission redundancy mode from Table 1 above can be specific to both a bearer and to an IP flow on that bearer.

Figure 2:
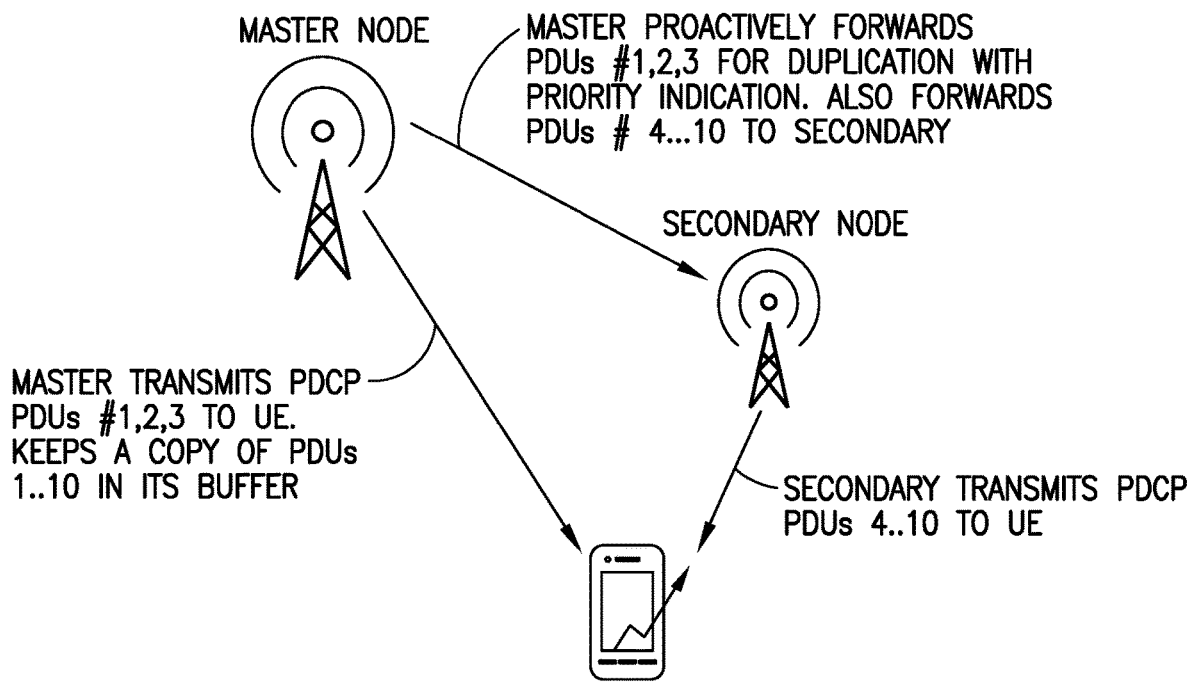
FIGS. 2-5 are schematic transmission diagrams illustrating an example of how the RLC node diversity redundancy retransmission mode for a bearer that is split between a master node and one secondary node according to these teachings.

FIGS. 2-5 are schematic transmission diagrams illustrating an example of how the RLC node diversity redundancy retransmission mode 4 from Table 1 above for a bearer split between a master node and one secondary node according to these teachings. Retransmissions in this example use a set of signaling procedures based on the UE's PDCP status report. Assume the UE's data bearer is split such that 30% of the PDUs are originally transmitted by the master node and 70% are originally transmitted by the secondary node. FIG. 2 begins with a total of ten PDCP PDUs being transmitted on the split bearer; PDU #s 1, 2 and 3 by the master and PDU #s 4, 5 . . . 10 by the secondary.

The master node forwards all packets to secondary node for duplication at the secondary, and the master keeps a copy of all these packets also in its own retransmission buffer. Per the split the master and secondary nodes transmit the PDU numbers mentioned above as original transmissions. At the secondary node, PDU #s 4-10 will be in its buffer A and PDU #s 1-3 will be in its buffer B, both of which are reserved for this bearer (and for this IP flow if there are multiple flows on this bearer) for this UE. For at least the packets that go into buffer B, optionally the master forwards them to the secondary with a priority indication.

Figure 3:
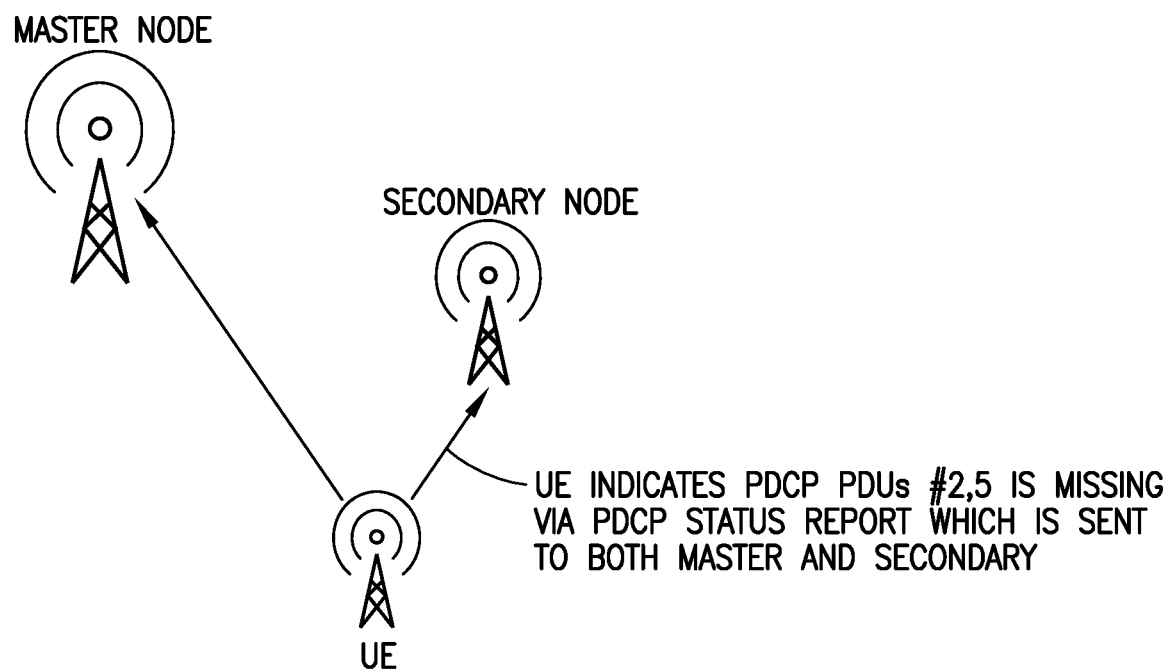

FIG. 3 begins with the UE multicasting its PDCP status report to both the master node and the secondary node. For this example, that PDCP status report indicates that that PDCP SDUs #2 and 5 are not received correctly by the UE, perhaps due to incorrect reception of SDUs at the UE while the master and secondary nodes have the correct PDUs in their respective buffers. In this example it is assumed there is a one-to-one mapping of SDUs to PDUs such as by adding a header to the SDUs to form the corresponding PDUs. Note that if PDCP PDU #4 was the first of these ten PDUs to be transmitted as original transmissions by the secondary as in this example, the UE is aware that PDP PDUs #1, 2 and 3 are already in the duplicate buffer at the secondary node.

Figure 4:
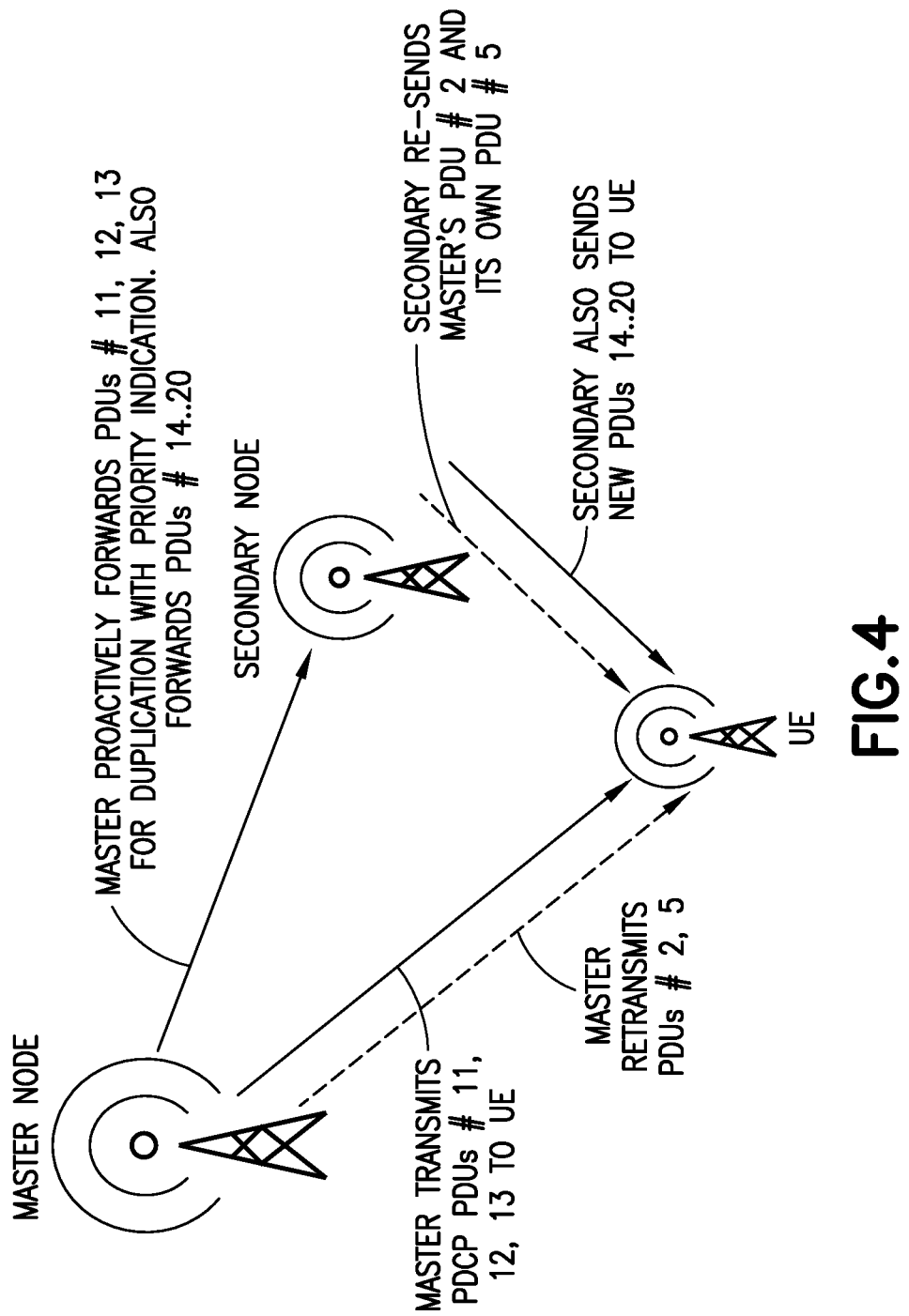

At FIG. 4 the master and secondary nodes respond to the UE's NACK of packets 3 and 5 according to mode 4 of Table 1 above. Specifically, as a matter of course PDU #s 11-20 are next in line to transmit to the UE on the split bearer, so like packets 1-10 the master forwards all those new PDUs 11-20 to the secondary, with an optional priority indication for packets 11-13 which are to be originally transmitted only by the master. The secondary puts packets 11-13 in its (potential) re-transmission buffer B and packets 14-20 in its original transmission buffer A.

Per the redundancy retransmission mode 4 of Table 1 above, all re-transmissions over the split bearer are to be done by both the master and by the secondary. In Table 1 over 50% of capacity means highly loaded but different thresholds to define high loading may be used on other deployments of these teachings. For this specific example, at FIG. 4 the master makes an original transmission of packets 11-13, and also re-transmits packets 2 and 5 that were NACK'd by the UE's status report. Packet 2 is a true re-transmission by the master since the master sent it originally; regardless that the master never sent packet 5 originally it will re-transmit packet 5 since that is what mode 4 of Table 1 directs when the master's and secondary's traffic/congestion conditions are both highly loaded. Similarly, the secondary makes an original transmission of packets 14-20, and also re-transmits packets 2 and 5 that were NACK'd by the UE's status report. In this case packet 2 was originally sent by the master and packet 5 was originally sent by the secondary. This mode 4 diversity retransmission is done to minimize further PDCP packet loss within a latency window.

Figure 5:
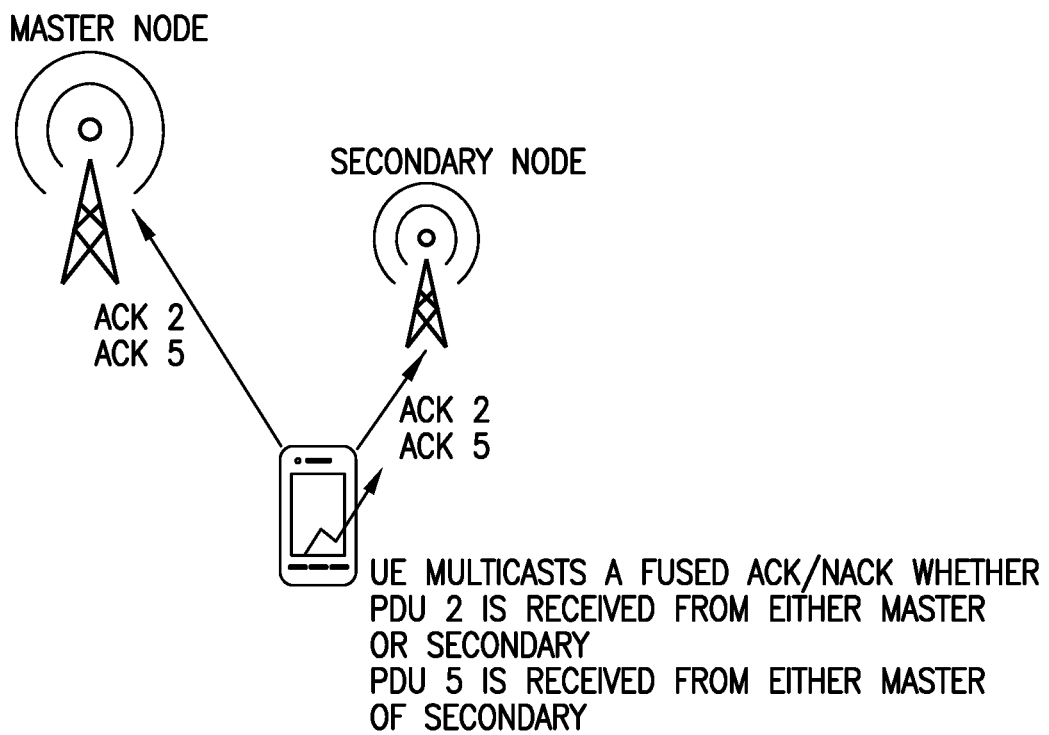

FIG. 5 illustrates the UE's response to receiving what the master and secondary transmitted to it in FIG. 4. For simplicity we will no longer consider packets 11-20; any NACKs for those will be reported as explained for FIG. 3 above. FIG. 5 concerns only the UE's response to the re-transmission of packets 2 and 5, and this response is a fused ACK/NACK reporting on both packets. It is fused in that if there is an ACK for a packet it does not matter whether the UE correctly received and decoded the packet from one or both of the re-transmitting entities; the UE reports an ACK regardless. The UE indicates a NACK only if it failed to receive and properly decode the re-transmitted packet from both the master and secondary (in this specific example of dual split bearer and mode 4 re-transmissions). Thus there is a fused ACK or NACK for packet 2, and a fused ACK/NACK for packet 5. In the FIG. 5 example both are fused ACKs, which the UE multicasts on multiple frequencies (both the master's and the secondary's HARQ channels) to reduce errors in ACK/NACK reception at the network master and secondary nodes. Only after receiving this ACK can the master and secondary flush packets 2 and 5 from their re-transmission buffers, else they will attempt again to re-transmit either or both of the NACK'd packets according to the corresponding open HARQ process.

Figure 6:
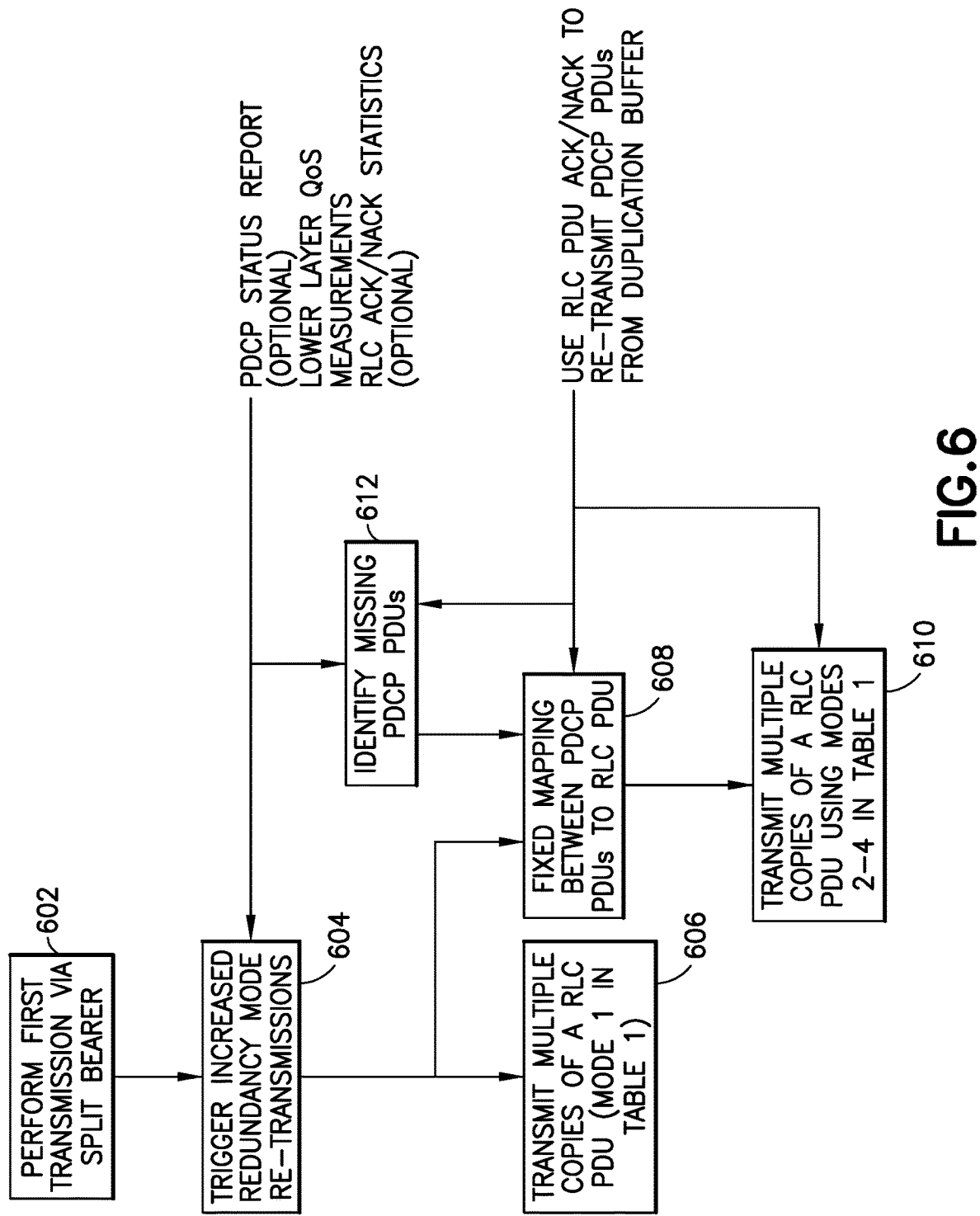
FIG. 6 is a process flow diagram illustrating a particular embodiment for how the selection is made from among four different redundancy retransmission modes.

The above more detailed example of how mode 4 from Table 1 above operates will also provide further clarity for the other modes of Table 1. FIG. 6 is a process flow diagram illustrating a particular embodiment for how the selection is made from among the four different redundancy retransmission modes of Table 1 above. It is this selection which configures the master and secondary for the selected mode. In one embodiment it is the master node that runs the process of FIG. 6, which then informs the secondary of its selection of the redundancy retransmission mode to use for a given split bearer (and for a given IP flow on that bearer if there are multiple flows on the split bearer and different modes are selected for the different flows).

FIG. 6 begins at block 602 in which there is a first transmission to a UE via a split bearer. Some event such as a PDCP status report from the UE, and/or measurements of QoS done by lower layers, and/or statistics of the RLC ACK/NACK history, triggers an increased redundancy mode for re-transmissions at block 604. If the network conditions are such that the selection of Table 1 is mode 1 then the process goes to block 606 where multiple copies of a RLC PDU are transmitted. If there is a fixed mapping of PDCP PDUs to RLC PDUs as at block 608 (for example, one PDCP PDU maps to one RLC PDU) then the other modes become an option, and so the network conditions may then force the mode selection to any of modes 2-4 of Table 1 above at block 610. If there is a fixed mapping then the RLC PDU ACK/NACK signaling can be used to re-transmit the PDCP PDUs from the duplication buffer (the secondary's buffer B in the example for FIGS. 2-5). Any of these NACKs can be used to directly identify the missing PDCP PDUs at block 612, which might alter the RLC ACK/NACK statistics and cause a different mode to be selected again at block 610.

Figure 7:
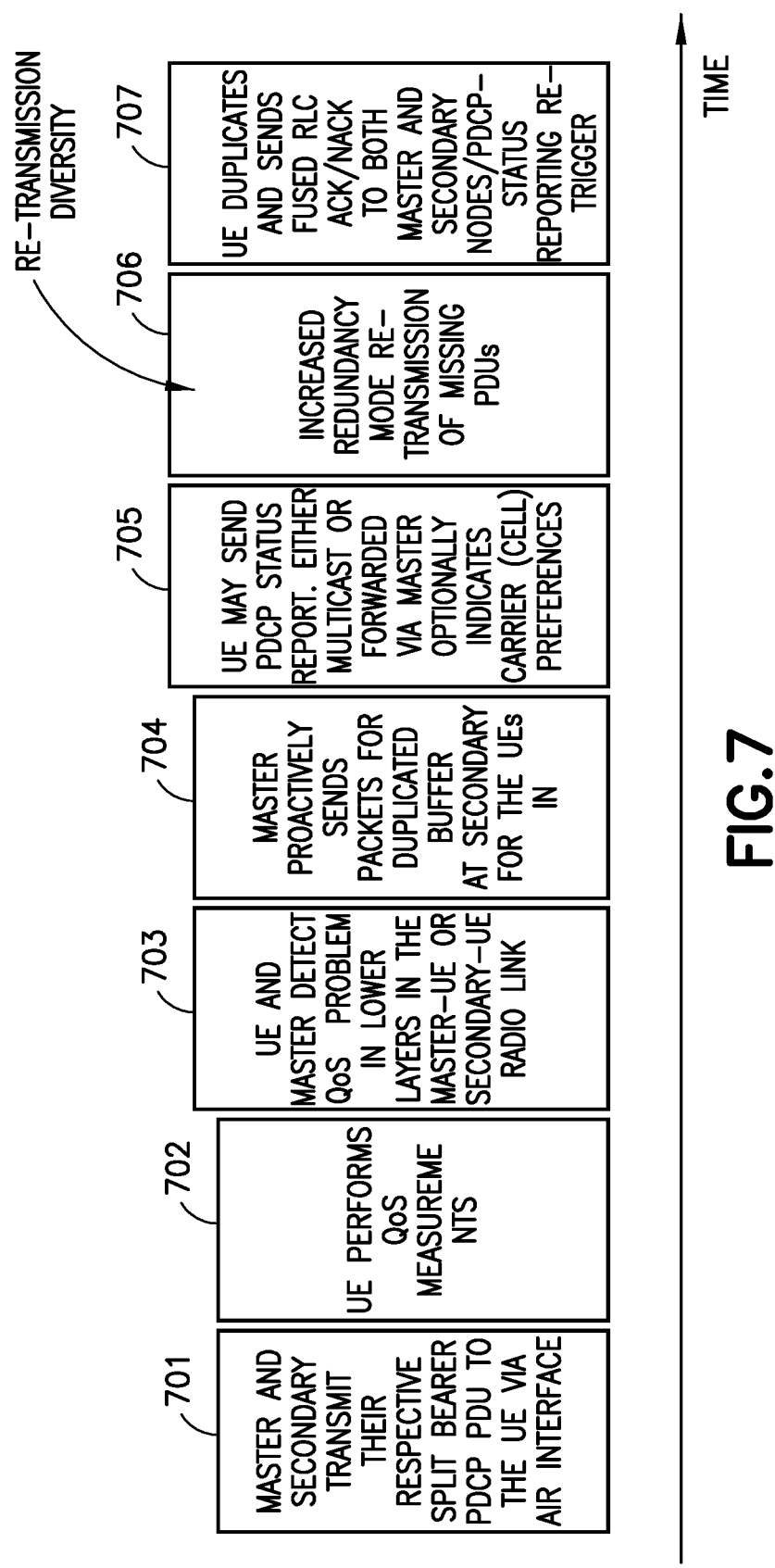
FIG. 7 describes a similar process for re-transmission diversity (PDCP or RLC re-transmission) from the perspective of the different entities involved.

FIG. 7 describes a similar process for re-transmission diversity (PDCP or RLC re-transmission) from the perspective of the different entities involved, shown chronologically from left to right. At block 701 the master and the secondary nodes transfer their respective split bearer PDCP PDUs to the UE via their respective wireless air interfaces. The UE performs some QoS measurement at block 702 and the UE as well as the master node detect at block 703 some problem in the radio link between the master node and the UE, and/or between the secondary node and the UE. As mentioned in FIG. 6, this may be a poor QoS, too many NACKs, or some other quality or reliability measure of the relevant air interface. Once that problem is detected then the process of FIG. 6 is run to select which of the redundancy retransmission modes to utilize to overcome or mitigate it.

For the remainder of FIG. 7 assume mode 4 is selected. At block 704 the master node proactively sends to the secondary node all the packets to be transmitted to the UE over any part of the split bearer so the secondary node can store them in its buffer A or buffer B as the case may be per packet. The UE sends its PDCP status report at block 705. In one deployment it is sent unicast and received directly at both the master and secondary nodes. In another embodiment it is sent only to the master node in which case the master must signal to the secondary node an indication of which packets have been NACK'd. The status report may also indicate the UE's preference for carrier frequency/cell. Re-transmission diversity for the NACK'd PDUs is realized at block 706 where the master and secondary nodes re-transmit the NACK'd PDUs according to the selected mode. Block 707 has the UE responding to those re-transmitted PDUs with a fused ACK and/or fused NACK to both the master and secondary nodes as detailed above with respect to FIG. 5. This fused ACK/NACK may be included within another PDCP status report, particularly if there was new data sent with the re-transmitted PDUs as was the case in the FIG. 4 example above where PDU #s 11-20 was the new data.

Embodiments of these teachings encompass certain signaling to enable the above re-transmission diversity from different legs. Specifically, there is 1) signaling from the master node (master eNodeB or MeNB) to the secondary eNodeB (SeNB) for buffer management at the SeNB. The SeNB may have three buffers to serve the given UE, split bearer buffer, SeNB PDCP buffer, and duplication buffer. This signaling will be used by SeNB to classify the duplication packets in another queue. There is also 2) signaling to enable UE multicasting. Multicasting is used for both a) UE PDCP status reporting for re-transmission diversity, and for b) fused ACK/NACK signaling from the RLC. Finally there is signaling for configuring the UE with the QoS measurement which is then used to trigger the proactive forwarding by the MeNB.

As a further example consider that PDCP PDU packets 1 . . . 3 are sent from the master node to the UE, and PDCP PDU packets 4 . . . 10 are sent via the X2 interface to the secondary node and then transmitted to the UE as in FIGS. 2-5 and detailed above.

In this further example, based on the splitting ratio enforced by RRC at master node, packets 1-3 are sent from the master node to the UE and packets 4-10 are sent over X2_U (user-plane) from the master node to the secondary node RLC buffer and finally from the secondary node to the UE. During transmission between the master node and the UE and also between the secondary node and the UE, because of low PHY layer throughput (as a result of congestion) packets 2 and 5 are not yet successfully sent to the UE.

In this case the UE selection for proactive duplication is done based on QoS problem detection in lower layers in the link between the master node and the UE. While the master node can collect KPIs such as packet delay and throughput statistics for the link to the UE, the UE can assist the master node in its mode selection decision by comparing the master-to-UE link to the secondary-to-UE link. The RRC entity (which is at the master node) can configure the UE to perform comparative QoS measurements which the UE reports to the master node.

One implementation for this additional UE comparison information is to setup the UE to compare the KPIs such as PHY (MAC) throughput and packet delay (for example, the expected delay between the first and last segment of PDCP SDUs) between the two radio legs. Physical layer measurements such as reference signal received power (RSRP, or alternatively reference signal received quality RSRQ) can be piggybacked with the above measurements.

In this regard the UE can perform QoS measurements of RSRP and PHY (MAC) throughput and report them to the master (RRC). For RSRP the UE can perform RSRP measurements of the two radio legs. For PHY (MAC) throughput the UE can perform and report the PHY (MAC) throughput of the two radio legs for that bearer.

At the master node the RRC entity can then use the following conditions as below Throughput_min<Throughout_masterleg<
    Throughput_target_HR     (Condition x)

Throughput_secondaryleg>Throughput_masterleg     (Condition y)

RSRP_master>RSRP_target     (Condition x1)

RSRP_secondary>RSRP_target     (Condition y1)

Throughput_target_HR represents the throughput required for high reliability services, while throughput_min represents the minimum throughout required for the master node to serve the data without high reliability. When the above 4 conditions are met, the master RRC entity can initiate proactive duplication of its data to the secondary node.

A feature for the above implementation of added UE measurements to aid the RRC entity in making the mode selection is that the UE is setup to send the QoS measurements at a pre-defined time period before it sends the PDPC status report. The reporting gap between the QoS measurement and the PDCP status can be used by the RRC entity and the MeNB in general to proactively duplicate the data for that UE (and selected bearers) to the SeNB for re-transmission diversity. This means that data for the UEs which are currently experiencing good QoS will not be duplicated to the relevant SeNB since the relevant QoS report will be received prior to any data forwarding from the MeNB to the SeNB, thus saving on the backhaul load. Throughput_masterleg and Throughput_secondaryleg would preferably be measured only for the successfully delivered MAC PDU packets.

Figure 8:
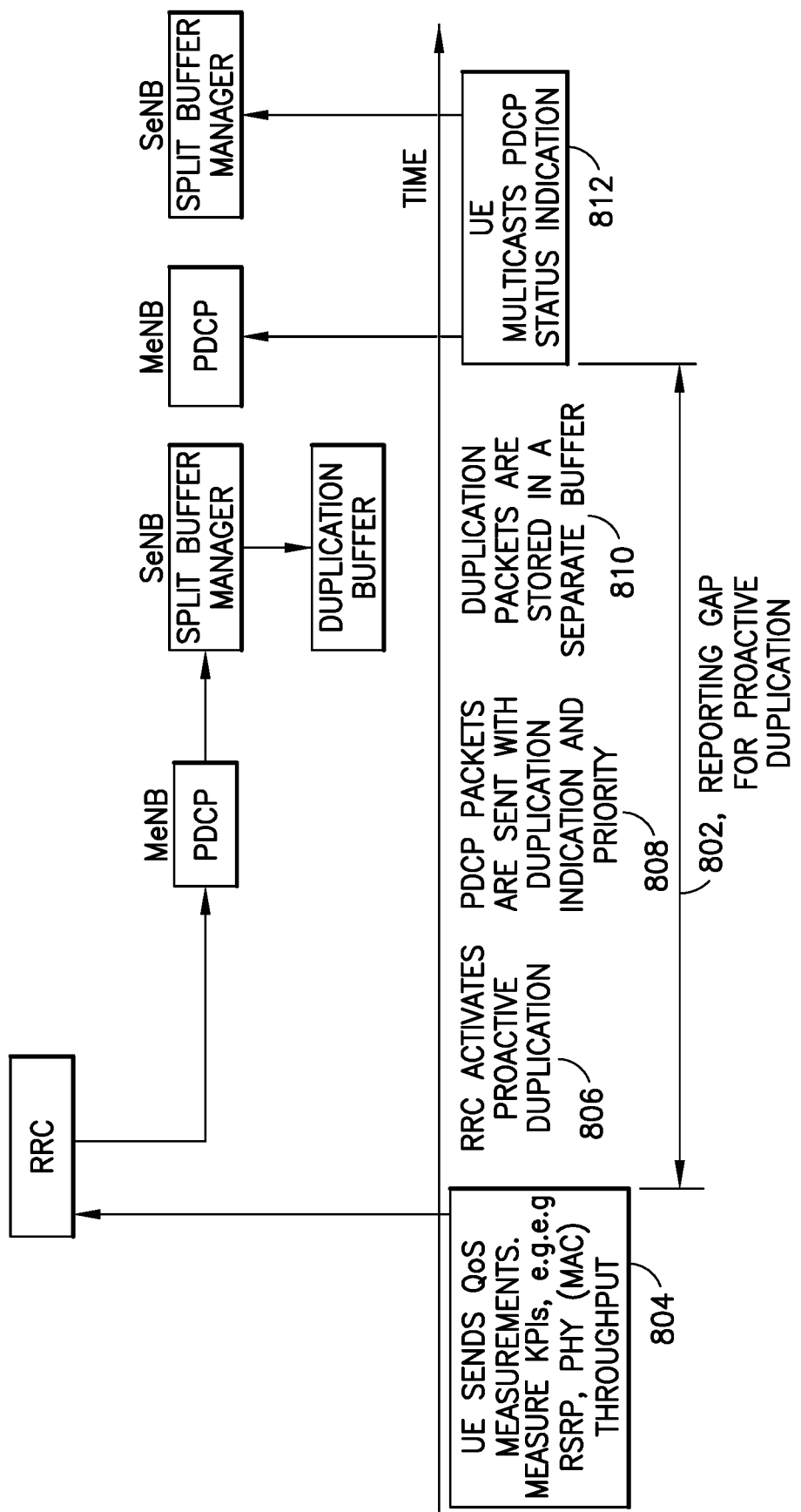
FIG. 8 is a process flow diagram showing one non-limiting example of how the reporting gap between the UE's QoS measurement report and the PDCP status report is used according to these teachings.

FIG. 8 is a process flow diagram showing more specifically one non-limiting example of how the reporting gap 802 between the UE's QoS measurement report 804 and the PDCP status report 812 is used according to these teachings. The RRC entity in the MeNB uses the QoS measurement report 804 to choose which mode from table 1 will be used for this split buffer, and informs the PDCP layer of that choice which in this example utilizes proactive PDU duplication that is activated at 806. At block 808 the MeNB's PDCP layer proactively sends the PDCP packets to the split buffer manager of the SeNB on the X2 interface, along with an indication of which packets are duplicates and the related priority. The SeNB maintains a duplicate buffer for PDCP packets which are sent to that buffer by the buffer manager at the SeNB per block 810. Finally the original PDUs are sent to the UE over the split bearer by the MeNB and SeNB, and only then does the UE multicast its PDCP status report 812 which informs if any packets are to be re-sent. If a packet originally sent by the MeNB is NACK'd, that same packet will be in the SeNB's duplication buffer to be re-sent also by the SeNB if mode 4 is selected. Packets that are ACK'd can be flushed from whichever buffer they are stored.

Figure 9:
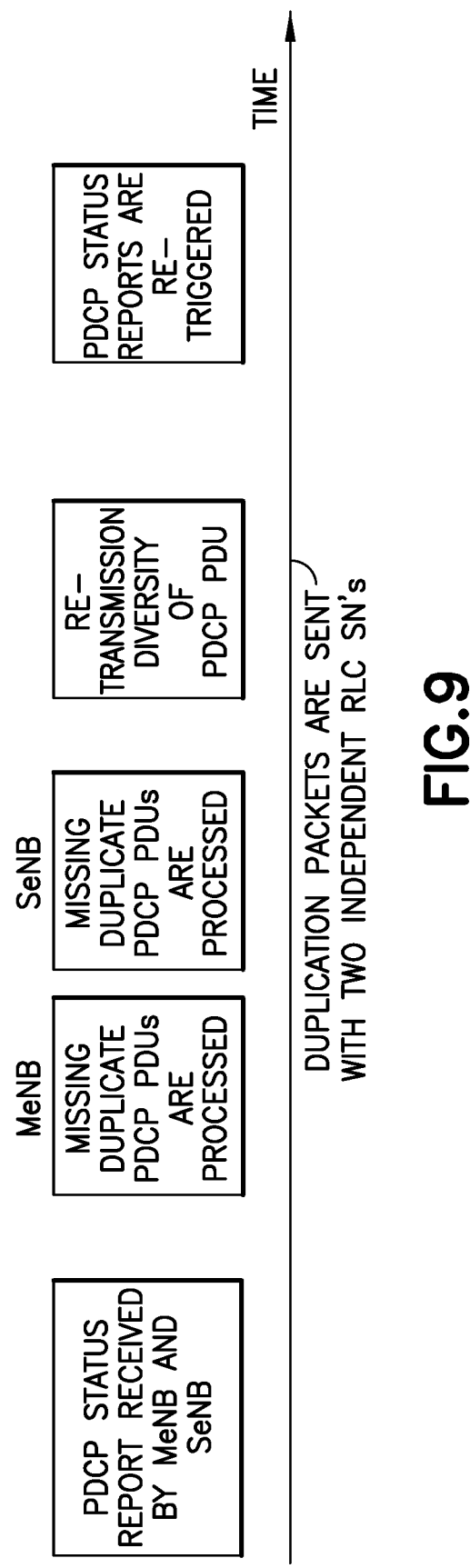
FIGS. 9-10 illustrates similar high level process overviews contrasting PDCP re-transmission diversity (FIG. 9) against RLC re-transmission diversity (FIG. 10) according to example embodiments of these teachings.
Figure 10:
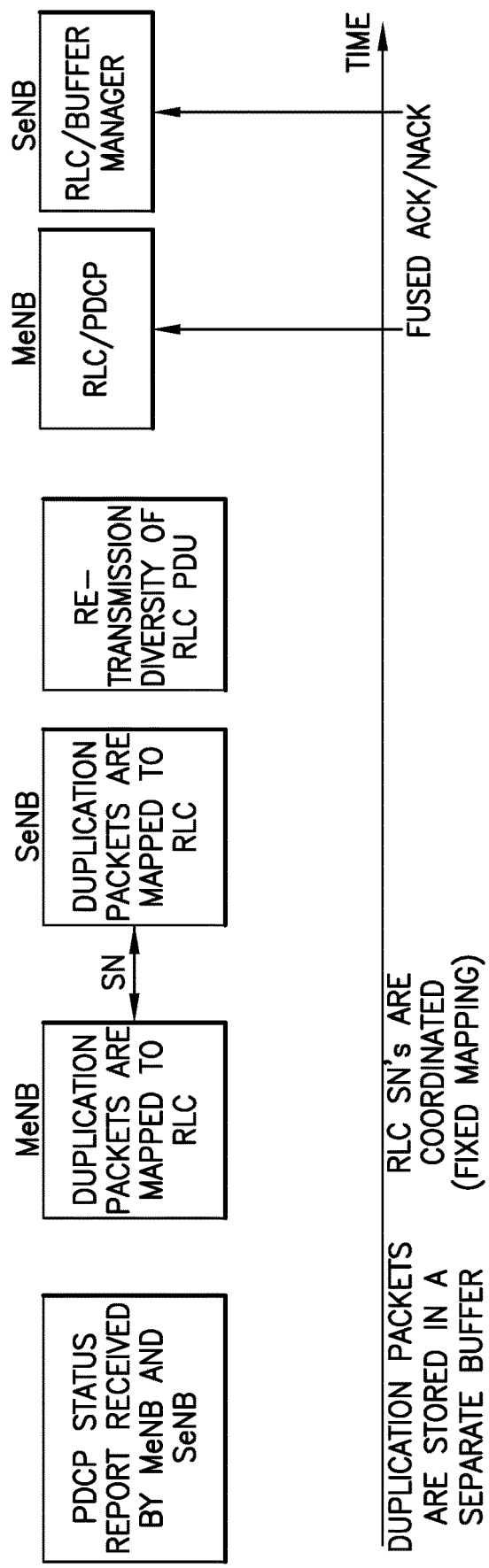

FIG. 9 illustrates a high level process overview for the case in which there is PDCP re-transmission diversity (modes 1-3 of Table 1 above), whereas FIG. 10 illustrates similar for the case of RLC re-transmission diversity (mode 4 of Table 1 above). Both begin similarly with the MeNB and SeNB each receiving the PDCP status report from the UE. For the case of PDCP re-transmission diversity (FIG. 9) the missing (NACK'd) packets that are also duplicates are processed in the MeNB and in the SeNB independently, and for the case a duplication packet is sent it has a different RLC serial number (SN) than its identical re-transmission from the other MeNB/SeNB entity. Typically the sending node randomly assigns a RLC serial number to the packets it transmits, primarily to track with its open HARQ processes. Certain embodiments of these teachings, such as the duplicate RLC transmissions for mode 4 in the above examples, break from that conventional random-SN process and coordinate the RLC SN for duplicate re-transmitted RLC PDUs. More specifically, the duplicate packets are identified as such (field 1102 of FIG. 11) along with the RLC SN (field 1104 of FIG. 11) when communicated over the X2 interface from the master node to the secondary node. FIG. 9 closes with another PDCP status report being triggered to ACK or NACK the duplicate packets it received from both the MeNB and SeNB (as well as any new packets), but in this case there is no fused ACK/NACK because of the different serial numbers which means for ACK/NACK purposes the UE treats these different packets as independent.

In FIG. 10 there is a fixed mapping of PDCP PDU to RLC PDU (for example, one-to-one or some other fixed mapping) which enables the RLC re-transmission diversity, and both MeNB and SeNB perform this mapping with the duplicate packets that for the SeNB are stored in a separate buffer. Due to the fixed mapping the serial numbers on the duplicate packets at the MeNB and at the SeNB are coordinated, and so the re-transmission can be of the RLC PDU rather than only the PDCP PDU. This enables the UE to fuse its ACK/NACK for the duplicate packets it receives in those re-transmissions as FIG. 10 illustrates.

Figure 11:
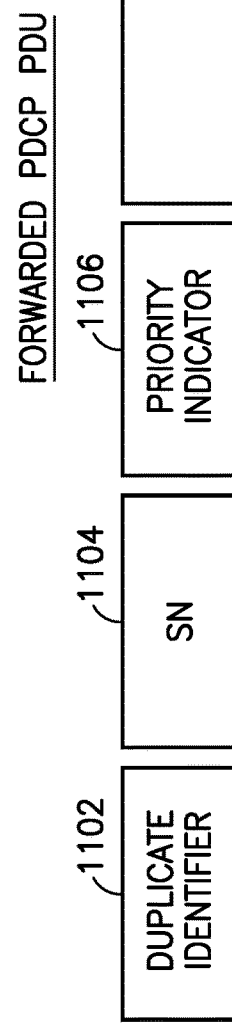
FIG. 11 is a block illustration of certain fields of a forwarded PDCP PDU according to certain embodiments of these teachings.

FIG. 11 is a block illustration of certain fields of a forwarded PDCP PDU that is sent from the MeNB to the SeNB on the backhaul (X2) link. Specifically, apart from the conventional PDCP PDU itself the MeNB adds a duplicate identifier field 1102 to identify to the SeNB that only the MeNB is to send this particular packet as an original (and thus the SeNB should store it in its duplicate buffer). There is also added a serial number field 1104 and a priority indication field 1106. These fields are added by the MeNB PDCP entity, which copies the serial number 1104 only when forwarding the duplicate packets. The SeNB buffer manager will then use the duplicate identifier 1102 to queue the packets in the SeNB's duplication buffer. The priority indicator 1106 will be used by SeNB MAC to (de)prioritize the duplicated packets since it will not be used for an original transmission by the SeNB. The SeNB will not consider or otherwise drop these indicator bits 1102, 1104, 1106 off the forwarded PDU while mapping to the RLC PDU. The SeNB buffer manager will use the SN 1104 to handle PDCP retransmissions.

The SN field 1104 indicates the sequence number of the PDCP PDU. For the case of RLC layer re-transmissions (RLC diversity), the serial number 1104 can indicate the RLC serial number which will be done with one to one mapping from PDCP SDU to RLC. The priority indicator 1106 is preferably 2 bits and indicates the priority level of the duplicated packets. The SeNB can use this indicator 1106 to determine if the MeNB's duplicate packets have to be re-transmitted with a higher priority, equal priority, or if they can be de-prioritized to the SeNB re-transmission packets.

The duplicate identifier 1102 is preferably 1 bit and is used by the SeNB buffer manager to queue the duplicate packets in a different PDCP buffer, different as compared to the SeNB's primary packets that it will send as original transmissions to the UE.

Figure 12:
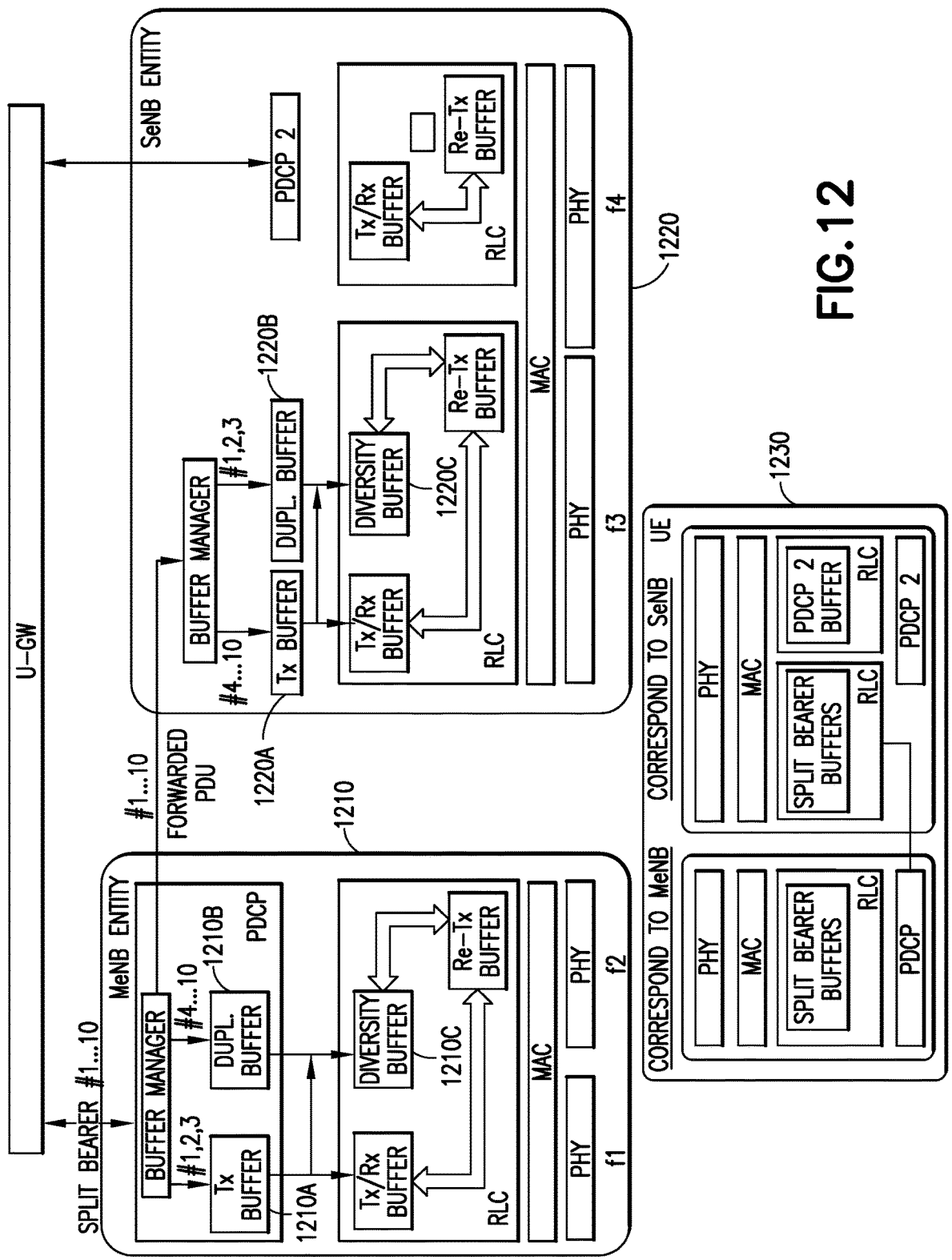
FIG. 12 is a schematic block diagram of certain components within the respective protocol stacks of the master and secondary nodes, and also the UE, for enabling proactive duplication of PDCP PDUs using a duplicate transmission buffer according to an embodiment.

FIG. 12 is a schematic block diagram of certain components within the respective protocol stacks of the master and secondary nodes, and also the UE, for enabling proactive duplication of PDCP PDUs using a duplicate transmission buffer according to an embodiment. The PDCP PDU numbers match those for the example above for FIGS. 2-5. Within the PDCP layer of the MeNB 1210 is a buffer manager, a transmit (TX) buffer and a duplicate buffer which is used for re-transmission diversity according to these teachings. The SeNB 1220 has similar buffers and the forwarded packets are segregated and stored in those different buffers by the SeNB's buffer manager using the duplicate identifiers 1102. PDUs for original transmissions are placed in the transmit/receive (TX/RX) buffer in the RLC layer at both the MeNB 1210 and the SeNB 1220. Packets that are re-transmitted conventionally go into the Re-TX buffer in the respective entity's RLC layer. Packets for diversity re-transmission according to these teachings, which in this example are PDU #s 4-10 for the MeNB 1210 and PDU #s 1-3 for the SeNB 1220, are placed in the diversity buffer of the respective MeNB and SeNB, and moved to the Re-TX buffer for actual re-transmission (along with other PDUs to be conventionally re-transmitted) in the event of a NACK from the UE. In the UE 1230 there are split bearer buffers at the RLC layer for receiving data from the MeNB 1210 and SeNB 1220 on that split bearer, with the labels PDCP and PDCP 2 used to distinguish data from the MeNB 1210 from that of the SeNB 1220. The f1, f2, f3 and f4 designations at the MeNB 1210 and SeNB 1220 represent different frequencies that define the different PHY layers on which the various PDUs may be sent.

More specifically, the PDCP Tx buffer 1210A, 1220A queues the packets that are transmitted as 'normal' packets, for example the transmitting leg is the primary for these packets. The split bearer packets that are transmitted straightaway (as original transmissions) by the secondary are stored in the PDCP Tx buffer 1220A, because the SeNB 1220 transmits these packets considering itself the primary node for those PDCP PDUs.

The PDCP duplicate buffer 1210B, 1220B queues the packets that are transmitted to 'assist' the other leg for reliable reception. Thus the packets in this buffer are not transmitted straightaway (they may be considered with a lower priority). The priority indication 1106 in the forwarded PDU (FIG. 11) may further indicate the priority level of the packets during re-transmission (for example, if the duplicate PDUs can be prioritized as compared to the RLC PDUs in the RCL Re-Tx buffer).

The diversity buffer 1210C, 1220C queues the duplicate RLC PDUs from the duplicate PDCP PDUs. In the case of RLC node diversity, the PDCP PDUs both from the Tx buffer 1210A, 1220A and duplicate buffer 1210B, 1220B is queued in this buffer 1210C, 1220C by doing a one-one mapping from PDCP PDUs to RLC PDUs. This buffer 1210C, 1220C functionally enables RLC diversity because the RLC always performs one-to-one mapping of serial numbers for packets in this buffer (hence the name 'Diversity buffer'.

The UE 1230 sends a multicast PDCP status report to the RRC entities located in the master node 1210 and in the secondary node 1220 informing of the missing SDUs as detailed above. The RRC entity in the master node 1210 will semi-statically (over a longer time period) configure, based on activation conditions such as those defined at Table 1, a selected one of the four possible increased redundancy modes and inform the secondary node 1220 over the X2-C (control plane) interface. As detailed above thee are at least two different ways to implement the secondary node 1220 to learn which SDUs are NACK'd: the UE can multicast its PDCP status report to both the master 1210 and secondary 1220 nodes, and the UE can send it to the master node 1210 which then forwards it to the secondary node 1220.

Figure 13:
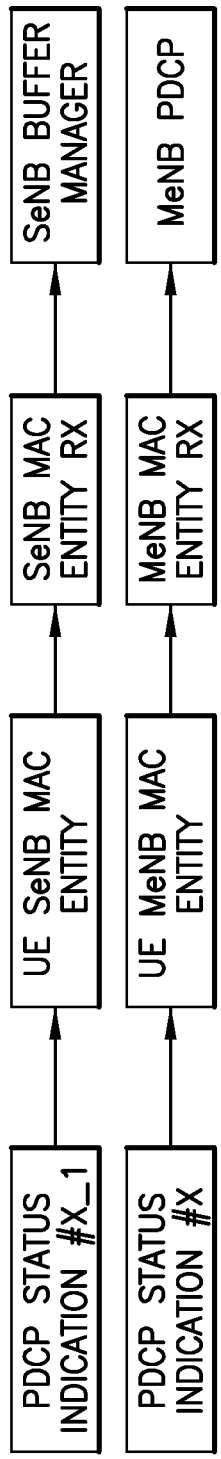
FIG. 13 illustrates one implementation for multicasting the UE's PDCP PDU status report, where the top and bottom portions indicate flow of information from the report through the respective secondary and master nodes.

FIG. 13 illustrates one implementation for the multicast option for such a PDCP status report, where the top and bottom portions indicate flow of information from the report through the respective secondary and master nodes. Multicasting of PDCP status report can utilize the duplicate packets efficiently. For this purpose, a copy of the PDCP status PDU is sent to the secondary leg (using the frequencies of the secondary leg).

The UE can inform the MeNB and SeNB that the status PDU has been multicast to the other leg. Using the existing PDCP status PDU format in LTE, one way is to indicate that the status PDU is a replica and to be used for sending 'duplicate packets'. FIG. 13 shows this at the leftmost portion where "status indication #x" is the original message to the MeNB on its frequency and "status indication #x_1" indicates to the SeNB that receives that copy of the report that it is in fact a replica of "status indication #x". The UE's PDCP status report goes to the respective entity's MAC layer, MAC entity receiver for decoding, and to the buffer manager in the SeNB and to the PDCP layer in the MeNB; for example into the respective Rx/Tx buffers 1220A, 1210A of FIG. 12.

Figure 14:
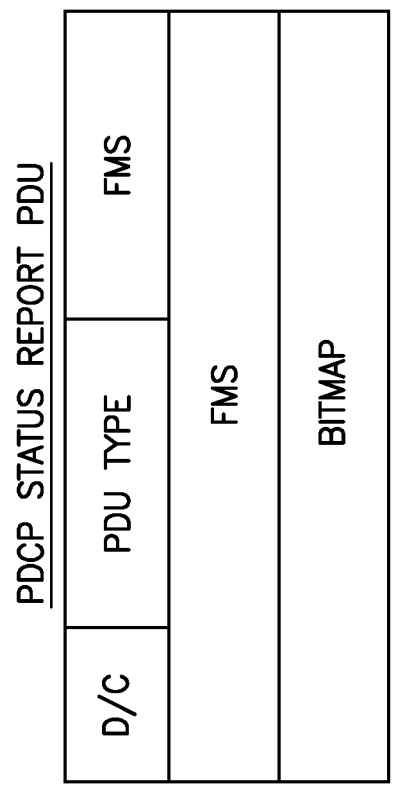
FIG. 14 illustrates certain fields of the UE's PDCP status report that are utilized for multicasting.

FIG. 14 illustrates certain fields of a PDCP status report. The PDU type field is used to indicate the PDCP status report is a replica (x_1), for example by setting PDU type=010 (this value is currently reserved and not utilized in LTE), and set D/C to 0 (control). The SeNB buffer manager can then interpret this PDCP status report for the duplication buffer based on PDU type=010. In this example the SeNB buffer manager does not need to send a report to the MeNB if the PDU type is set to 010.

In an embodiment the PDCP status report can also include the UE's QoS measurement information. But whether via the PDCP status report or other means by which the MeNB learns the latest QoS measurements, further assistance and QoS optimization can be realized as follows in an example embodiment. As to bearer priority handling the UE may indicate the bearer priority (for example, bearer m is highest priority) or it may deduced by the master node. Therefore in this case, the secondary node may prioritize the duplicated packets of a bearer m corresponding to priority service by temporarily suspending the packet transmission of another split bearer n at the secondary node. As to dynamic secondary cell selection, the UE may indicate the carrier frequency (for example, indicate the preferred secondary cell) for the re-transmission of the PDCP PDUs by the secondary node. As with FIGS. 2-5, this assumes that node diversity mode 4 is the selected redundancy retransmission mode.

Figure 15:
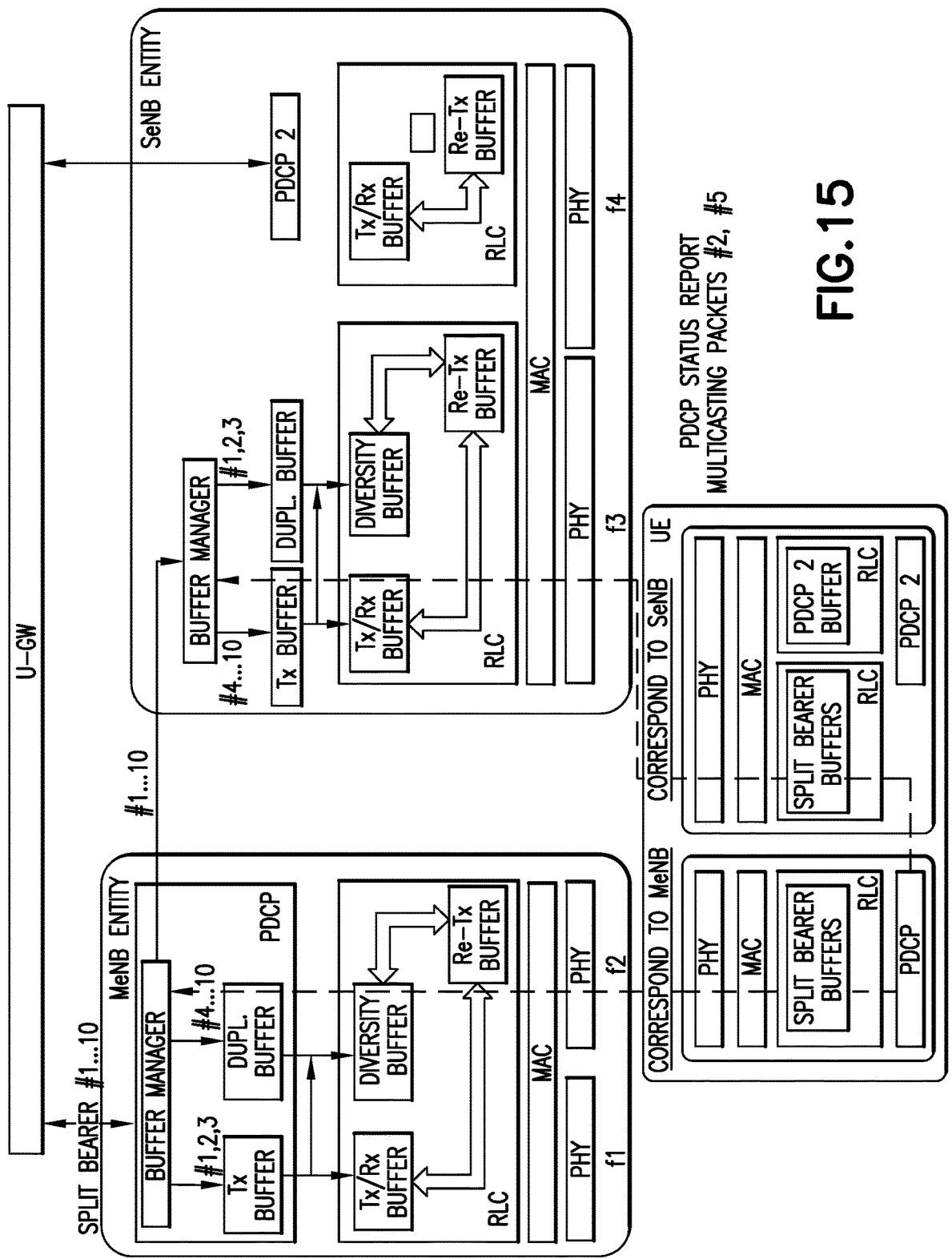
FIG. 15 is a block diagram similar to FIG. 12 specifically showing the UE multicasting its PDCP status report to both the MeNB and the SeNB.

FIG. 15 is a block diagram similar to FIG. 12 specifically showing the UE multicasting its PDCP status report to both the MeNB and the SeNB, consistent with the above example in which PDU #s 2 and 5 are being NACK'd. After receiving that status report with the NACKs is when the re-transmission diversity according to these teachings actually occurs (that is, when the packets in the diversity buffers are actually re-transmitted).

Figure 16:
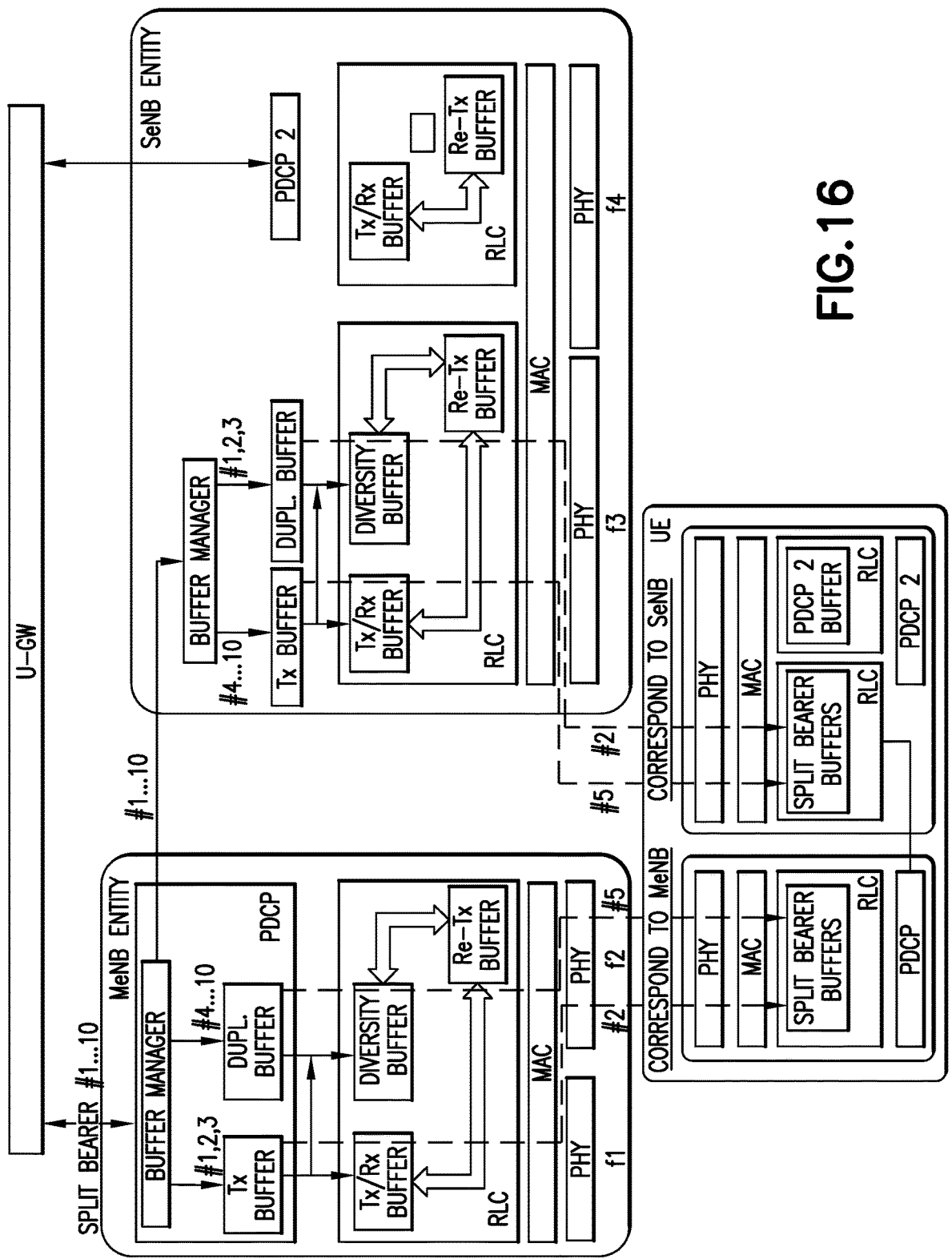
FIG. 16 is a block diagram similar to FIG. 12 specifically showing the diversity re-transmissions according to these teachings that are triggered by the NACKs in the UE's multicast PDCP status report.

FIG. 16 is a block diagram similar to FIG. 12 specifically showing the diversity re-transmissions according to these teachings that are triggered by the NACKs in the UE's multicast PDCP status report. Both the MeNB and SeNB now re-transmit the same PDCP SDUs with diversity by using the duplicated packets in the duplicate buffer.

The forwarded PDCP PDUs with a duplication indication can be used in two ways by the SeNB (and by the MeNB) based on the decision made in the RRC layer. If the mode decision made at the RRC layer is for PDCP re-transmission diversity mode, the same PDCP SDUs are re-transmitted using the two legs (MeNB and SeNB) from the PDCP layer.

If instead the mode decision made at the RRC layer is for RLC re-transmission diversity mode, then upon receiving the first PDCP status report the PDCP SDUs and PDUs are one to one mapped as RLC PDUs, and the same RLC serial numbers are used in the two legs (MeNB and SeNB) which are queued in the 'diversity buffer'. Re-transmission diversity is then obtained from the RLC layer; that is, the same RLC PDU may be re-transmitted by both the MeNB and SeNB legs repeatedly as FIG. 16 shows where both of the NACK'd PDU #s 2 and 5 are re-transmitted by each of those entities. To obtain a correlation in the RLC PDU serial numbers between the two legs, a fixed one-one mapping is used from PDCP serial numbers to RLC serial numbers. From this mechanism, one could further exploit fused RLC ACN/NACKs multicasting as described above and further detailed immediately below.

Figure 17:
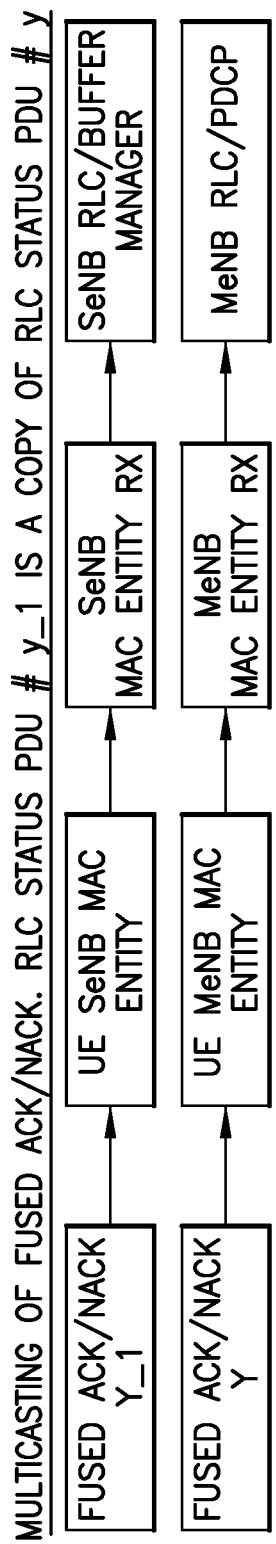
FIG. 17 is similar to FIG. 13 but shows process flow for the UE's multicasted fused acknowledgement for an increased redundancy mode.

FIG. 17 is similar to FIG. 13 but shows process flow for the UE's fused acknowledgement which is multicasted to the MeNB and to the SeNB. In this case the RLC status PDU identified as #y is the original fused ACK/NACK report to the MeNB sent on the MeNB's uplink frequency whereas the RLC status PDU identified as #y_1 is a copy/replica of that same fused ACK/NACK report but sent to the SeNB sent on the SeNB's uplink frequency. The original and copy of the fused ACK/NACK may use the same PDU serial number or a fixed serial number map for the duplicate PDUs may be used instead. The ACK or NACK for each of the re-transmitted PDUs is a fused ACK or NACK, determined using a logical OR of the RLC ACK/NACKs of each of the RLC PDU copies. Thus the UE produces an ACK if the RLC PDU is correctly received from one or both of the two legs in this 2-leg example. Note that without a fused ACK/NACK, the UE may be transmitting a NACK over one radio leg and an ACK in the other which would result in inefficient re-transmissions from the NACK'd radio leg, as was detailed further above by example.

Figure 18:
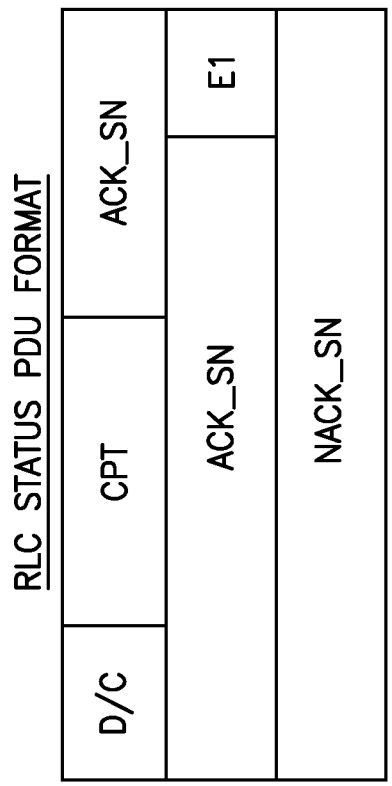
FIG. 18 is similar to FIG. 14 but shows fields for the UE's RLC status PDU that carries the fused ACK/NACK signaling.

FIG. 18 is similar to FIG. 14 but shows fields for the UE's RLC status PDU that carries the fused ACK/NACK signaling. To let the SeNB know that the RLC status PDU carries fused ACKs/NACKs, an indication can be used within such a RLC status PDU itself. If one were to use the LTE RLC STATUS PDU format, the CPT field can be used for this purpose, where for example CPT=[0 0 1] can indicate to both the SeNB and the MeNB that this RLC status PDU is obtained from fusing ACKs/NACKs across the two legs (or more generally if there is more than one SeNB, across all the legs being utilized for the current redundancy retransmission mode).

Figure 19:
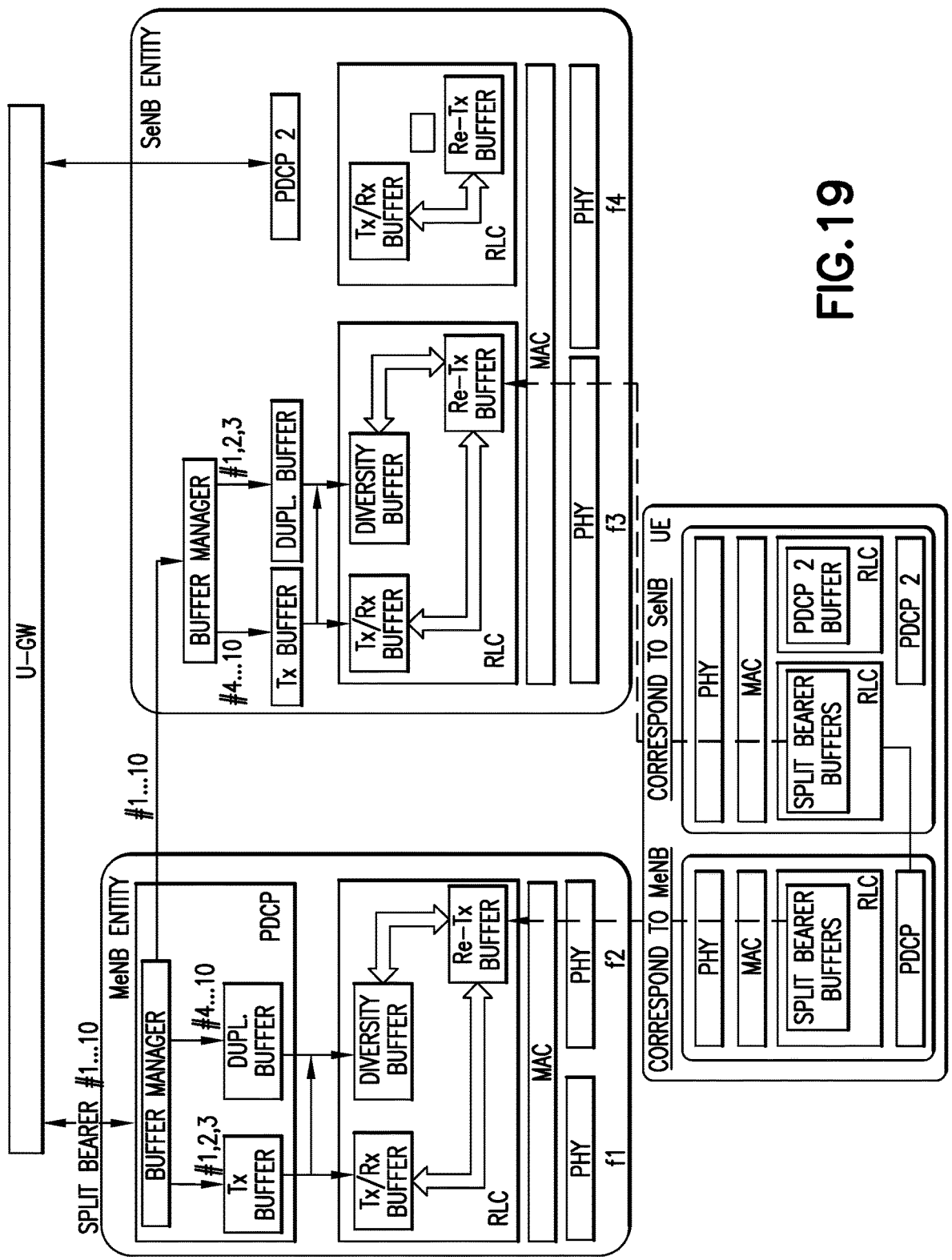
FIG. 19 is a block diagram similar to FIG. 12 specifically showing the UE's multicasting of the RLC status PDU with fused ACKs/NACKs for the increased redundancy mode to the MeNB and to the SeNB.

FIG. 19 is a block diagram similar to FIG. 12 specifically showing the UE's multicasting of the RLC status PDU with fused ACKs/NACKs for the increased redundancy mode to the MeNB and to the SeNB.

Figure 20:
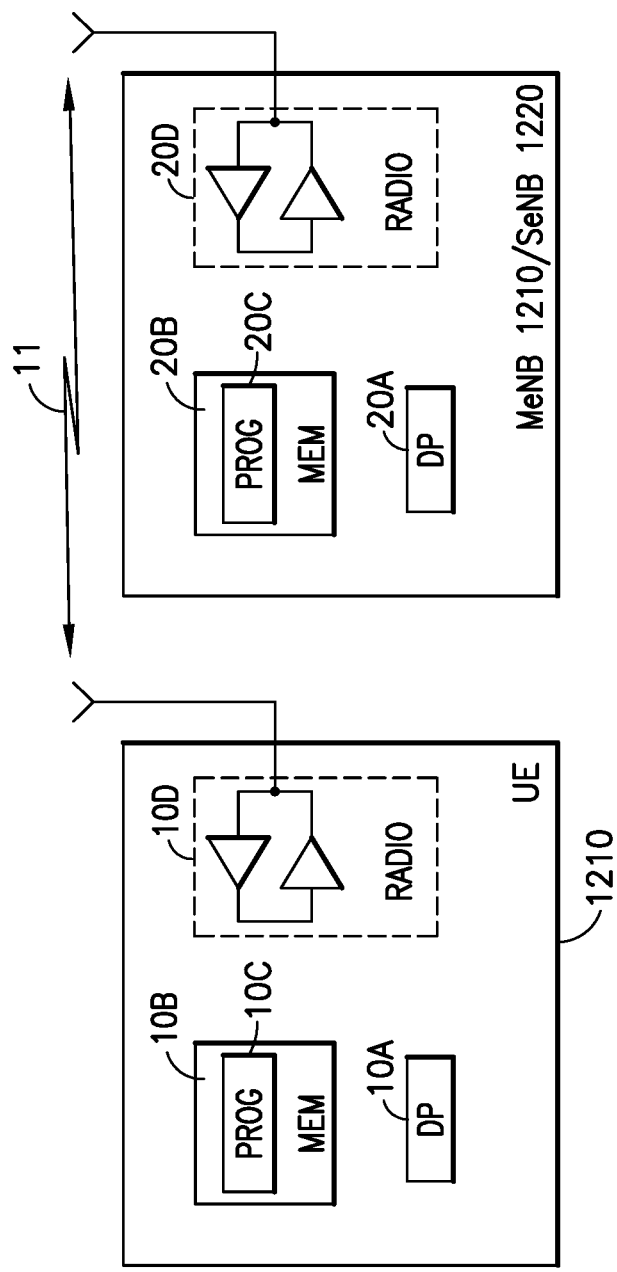
FIG. 20 is a high level schematic block diagram showing further components of the MeNB/SeNB and UE that are suitable for practicing certain of these teachings.

FIG. 20 is a schematic diagram illustrating some further components in addition to those already shown and described for the MeNB 1210 and the SeNB 1220, and further components of the UE 1230 in addition to those shown already shown. In the wireless system/cell a wireless network is adapted for communication over a wireless link 11 such as the described split bearer with an apparatus such as a mobile communication device which may be referred to as a UE 10, via multiple radio network access nodes such as the MeNB and SeNB. The network may include a network control element (NCE, not shown) that may include mobility management entity/serving gateway (MME/S-GW) functionality, and which provides connectivity with a further network such as a telephone network and/or a data communications network (e.g., the internet).

The UE 1230 includes a controller, such as a computer or a data processor (DP) 10D, a computer-readable memory medium embodied as a memory (MEM) 10B that stores a program of computer instructions (PROG) 10C as well as embodying the variously described buffers, and a suitable wireless interface, such as radio frequency (RF) transmitter/ receiver combination 10D for bidirectional wireless communications with the MeNB 1210 and SeNB 1220 via one or more antennas.

The wireless link between the UE 10 and the MeNB 1210/SeNB 1220 can be checked for link quality by comparing a measurement of it (for example, received signal strength or quality) against some minimum threshold. Further, the UE 1230 includes a galvanic power supply or other portable power supply.

Each of the MeNB 1210 and SeNB 1220 also includes a controller, such as a computer or a data processor (DP) 20A, a computer-readable memory medium embodied as a memory (MEM) 20B that stores a program of computer instructions (PROG) 20C as well as the variously described buffers, and a suitable wireless interface, such as RF transmitter/receiver combination 20D for communication with the UE 10 (as well as other UEs) via one or more antennas. The MeNB 1210 and possibly also the SeNB 1220 is coupled via a data/control path (not shown) to the NCE and this path may be implemented as an interface. The MeNB 1210 and SeNB 1220 are also coupled to one another, and possibly to further eNBs, via another data/control path, which may be implemented in the LTE radio access technology as an X2 interface with both user plane (X-U) and control plane (X-C) instances.

At least one of the PROGs 10C/20C is assumed to include program instructions that, when executed by the associated DP 10A/20A, enable the device to operate in accordance with exemplary embodiments of this invention as detailed above. That is, various exemplary embodiments of this invention may be implemented at least in part by computer software executable by the DP 10A of the UE 10; by the DP 20A of the MeNB 1210 and SeNB 1220, or by hardware or by a combination of software and hardware (and firmware).

In various exemplary embodiments the UE 10 and/or the MeNB 1210 and/or the SeNB 1220 may also include dedicated processors, for example a RRC module, a radio-frequency (RF) front end, and the like. There may also be one or more modules that is/are constructed so as to operate in accordance with various exemplary embodiments of these teachings.

The computer readable MEMs 10B/20B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DPs 10A/20A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., the radios 10D/20D) may be of any type suitable to the local technical environment and may be implemented using any suitable communication technology such as individual transmitters, receivers, transceivers or a combination of such components.

In general, the various embodiments of the UE 10 can include, but are not limited to, smart phones, machine-to-machine (M2M) communication devices, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

What is claimed is:

1. A method comprising:
   by a master network node, receiving a quality of service, QoS, measurement from a user equipment, UE;
   based on the received QoS measurement, forwarding by the master network node a data packet of a radio bearer for duplication to a secondary network node, wherein the radio bearer is split between the master network node and the secondary network node for wirelessly sending packets to a user equipment, UE;
   determining relative network conditions between the master network node and the secondary network node;
   based on the relative network conditions, selecting a redundancy retransmission mode from among multiple redundancy retransmission modes, each redundancy retransmission mode defining a different protocol for retransmitting multiple copies of selected ones of the packets to the UE over the split radio bearer; and
   wirelessly retransmitting to the UE the multiple copies of the selected packets over the split radio bearer according to the selected redundancy retransmission mode.

2. The method according to claim 1, wherein selecting the redundancy retransmission mode from among multiple redundancy retransmission modes comprises:
   determining a latency target for the packets;
   determining relative link quality between a first radio link connecting the master network node with the UE and a second radio link connecting the secondary network node with the UE; and
   selecting the redundancy retransmission mode based on the determined latency target and the determined relative link quality.

3. The method according to claim 1, wherein the relative network conditions reflect user-plane loading of the respective master and secondary network nodes.

4. The method according to claim 3, wherein different relative network conditions are used to select different ones of the multiple redundancy retransmission modes, and the different relative network conditions include:
  user-plane loading of both the master and secondary network nodes is below a threshold;
  user-plane loading of the master but not the secondary network node is above a threshold;
  user-plane loading of the secondary but not the master network node is above a threshold; or
  user-plane loading of both the master and secondary network nodes is above a threshold.

5. The method according to claim 1, wherein the multiple redundancy retransmission modes comprise:
  the master and secondary network nodes both perform independent retransmissions of the selected ones of the packets at least by sending different packets;
  the master network node performs retransmissions for the secondary network node of the multiple copies of the selected ones of the packets, and the secondary network node does not perform retransmissions of the selected ones of the selected packets;
  the secondary network node performs retransmissions for the master network node of the multiple copies of the selected ones of the packets, and the master network node does not perform retransmissions of the selected ones of the packets; and
  the master and secondary network nodes both perform retransmissions of the selected ones of the packets at least by retransmitting identical packets.

6. The method according to claim 1, wherein:
  for at least a first one of the selected modes, the packets that are wirelessly retransmitted are Packet Data Convergence Protocol Protocol Data Units, PDCP PDUs, different from Radio Link Control Protocol Data Units, RLC PDUs; and
  for at least a second one of the selected modes, the packets that are wirelessly retransmitted are RLC PDUs different from PDCP PDUs.

7. The method according to claim 6, wherein for at least the second one of the selected modes, serial numbers of the multiple copies of the RLC PDUs that are re-transmitted are identical or map directly to one another.

8. The method according to claim 7, further comprising:
  in response to re-transmitting the multiple copies of the RLC PDUs, receiving an acknowledgement, ACK, or a negative acknowledgement, NACK, from the UE which is a fused ACK or a fused NACK that represents a logical OR operation on the UE's receipt of the multiple copies of the RLC PDUs.

9. The method according to claim 1, wherein the data packet of the selected bearer for duplication comprises:
  all packets to be originally transmitted by the master node and all packets to be originally transmitted by the secondary network node.

10. The method according to claim 9, wherein for at least one of the modes each of the data packets of the selected bearer for duplication comprises at least one of an indication of whether the respective packet is a duplicate, an indication of the serial number of the respective packet, or an indication of the respective packet's priority.

11. The method according to claim 1, wherein the multiple redundancy retransmission modes comprise:
  the master and secondary network nodes both perform independent retransmissions of the selected ones of the packets at least by sending different packets;
  the master network node performs retransmissions for the secondary network node of the multiple copies of the selected ones of the packets, and the secondary network node does not perform retransmissions of the selected ones of the selected packets;
  the secondary network node performs retransmissions for the master network node of the multiple copies of the selected ones of the packets, and the master network node does not perform retransmissions of the selected ones of the packets; and
  the master and secondary network nodes both perform retransmissions of the selected ones of the packets at least by retransmitting identical packets.

12. The method according to claim 1, wherein:
  for at least a first one of the selected modes, the packets that are wirelessly retransmitted are Packet Data Convergence Protocol Protocol Data Units, PDCP PDUs, different from Radio Link Control Protocol Data Units, RLC PDUs; and
  for at least a second one of the selected modes, the packets that are wirelessly retransmitted are RLC PDUs different from PDCP PDUs.

13. An apparatus for communicating with a secondary network node and with a user equipment, the apparatus comprising:
  at least one memory storing computer program instructions; and
  at least one processor; wherein the at least one memory with the computer program instructions is configured with the at least one processor to cause the apparatus to at least:
  by a master network node, receive a quality of service, QoS, measurement from a user equipment, UE;
  based on the received QoS measurement, forward by the master network node a data packet of a radio bearer for duplication to a secondary network node, wherein the radio bearer is split between the master network node and the secondary network node for wirelessly sending packets to a user equipment, UE;
  determine relative network conditions between the master network node and the secondary network node;
  based on the relative network conditions, select a redundancy retransmission mode from among multiple redundancy retransmission modes, each redundancy retransmission mode defining a different protocol for retransmitting multiple copies of selected ones of the packets to the UE over the split radio bearer; and
  wirelessly retransmit to the UE the multiple copies of the selected packets over the split radio bearer according to the selected redundancy retransmission mode.

14. The apparatus according to claim 13, wherein when selecting the redundancy retransmission mode from among multiple redundancy retransmission modes, the at least one memory with the computer program instructions is configured with the at least one processor to cause the apparatus to:
  determine a latency target for the packets;
  determine relative link quality between a first radio link connecting the master network node with the UE and a second radio link connecting the secondary network node with the UE; and
  select the redundancy retransmission mode based on the determined latency target and the determined relative link quality.

15. The apparatus according to claim 13 wherein the relative network conditions reflect user-plane loading of the respective master and secondary network nodes.

16. The apparatus according to claim 15, wherein different relative network conditions are used to select different ones of the multiple redundancy retransmission modes, and the different relative network conditions include:

user-plane loading of both the master and secondary network nodes is below a threshold;
user-plane loading of the master but not the secondary network node is above a threshold;
user-plane loading of the secondary but not the master network node is above a threshold; or
user-plane loading of both the master and secondary network nodes is above a threshold.

17. The apparatus according to claim 13, wherein the multiple redundancy retransmission modes comprise:
the master and secondary network nodes both perform independent retransmissions of the selected ones of the packets at least by sending different packets;
the master network node performs retransmissions for the secondary network node of the multiple copies of the selected ones of the packets, and the secondary network node does not perform retransmissions of the selected ones of the packets;
the secondary network node performs retransmissions for the master network node of the multiple copies of the selected ones of the packets, and the master network node does not perform retransmissions of the selected ones of the packets; and
the master and secondary network nodes both perform retransmissions of the selected ones of the packets at least by retransmitting identical packets.

18. The apparatus according to claim 13, wherein: for at least a first one of the selected modes, the packets that are wirelessly retransmitted are PDCP PDUs different from RLC PDUs; and for at least a second one of the selected modes, the packets that are wirelessly retransmitted are RLC PDUs different from PDCP PDUs.

19. The apparatus according to claim 18, wherein for at least the second one of the selected modes, serial numbers of the multiple copies of the RLC PDUs that are retransmitted are identical or map directly to one another.

20. The apparatus according to claim 19, wherein the at least one memory with the computer program instructions is configured with the at least one processor to cause the apparatus further to:
in response to re-transmitting the multiple copies of the RLC PDUs, receive an acknowledgement, ACK, or a negative acknowledgement, NACK, from the UE which is a fused ACK or a fused NACK that represents a logical OR operation on the UE's receipt of the multiple copies of the RLC PDUs.

21. The apparatus according to claim 13, wherein the data packet of the selected bearer for duplication comprises:
all packets to be originally transmitted by the secondary network node.

22. The apparatus according to claim 21, wherein for at least one of the modes each of the data packets of the selected bearer for duplication comprises least one of an indication of whether the respective packet is a duplicate, an indication of the serial number of the respective packet, or an indication of the respective packet's priority.

23. A method comprising:
by a secondary network node:
receiving from a master network node a data packet of a selected bearer for duplication;
determining relative network conditions between the master network node and the secondary network node;
based on the relative network conditions, selecting a redundancy retransmission mode from among multiple redundancy retransmission modes, each redundancy retransmission mode defining a different protocol for retransmitting multiple copies of selected ones of the packets to the UE over a split radio bearer; and
wirelessly retransmitting to the UE the multiple copies of the selected packets over the split radio bearer according to the selected redundancy retransmission mode.

24. The method according to claim 23, wherein the relative network conditions reflect user-plane loading of the respective master and secondary network nodes, wherein different relative network conditions are used to select different ones of the multiple redundancy retransmission modes, and wherein the different relative network conditions include:
user-plane loading of both the master and secondary network nodes is below a threshold;
user-plane loading of the master but not the secondary network node is above a threshold;
user-plane loading of the secondary but not the master network node is above a threshold; or
user-plane loading of both the master and secondary network nodes is above a threshold.

25. The method according to claim 23, the method further comprising:
segregating the received packets that are indicated to be duplicates into a first buffer that is a duplicate buffer for duplicated retransmissions and the received packets that are not indicated to be duplicates into a second buffer that is an original transmission buffer for the split bearer.

* * * * *

UNITED STATES PATENT AND TRADEMARK OFFICE
CERTIFICATE OF CORRECTION

PATENT NO. : 10,716,122 B2
APPLICATION NO. : 16/092376
DATED : July 14, 2020
INVENTOR(S) : Reza Holakouei and Venkatkumar Venkatasubramanian It is certified that error appears in the above-identified patent and that said Letters Patent is hereby corrected as shown below:

In the Claims

In Claim 22:
Column 22, Line 5, "comprises least" should be deleted and --comprises at least-- should be inserted.

Signed and Sealed this
Eighteenth Day of August, 2020

Andrei Iancu
*Director of the United States Patent and Trademark Office*